Dec. 28, 1965   C. M. INGLETT   3,225,514
AUTOMATIC BAG-HANGING AND BAG-FILLING APPARATUS
Filed Nov. 15, 1960   13 Sheets-Sheet 1

INVENTOR.
Cecil M. Inglett
BY
Bacon & Thomas
ATTORNEYS

Dec. 28, 1965 C. M. INGLETT 3,225,514
AUTOMATIC BAG-HANGING AND BAG-FILLING APPARATUS
Filed Nov. 15, 1960 13 Sheets-Sheet 2

INVENTOR.
Cecil M. Inglett
BY
Bacon & Thomas
ATTORNEYS

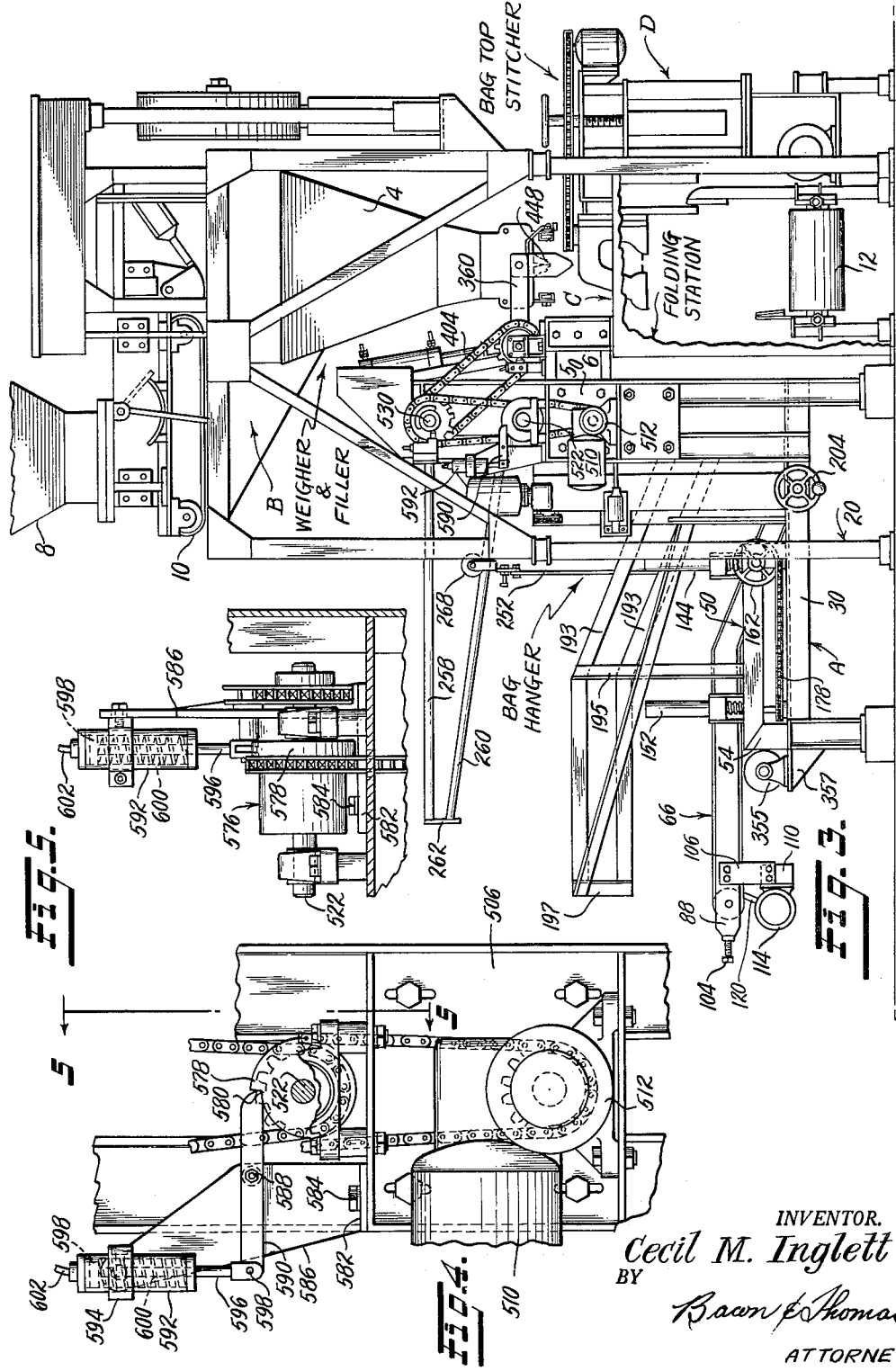

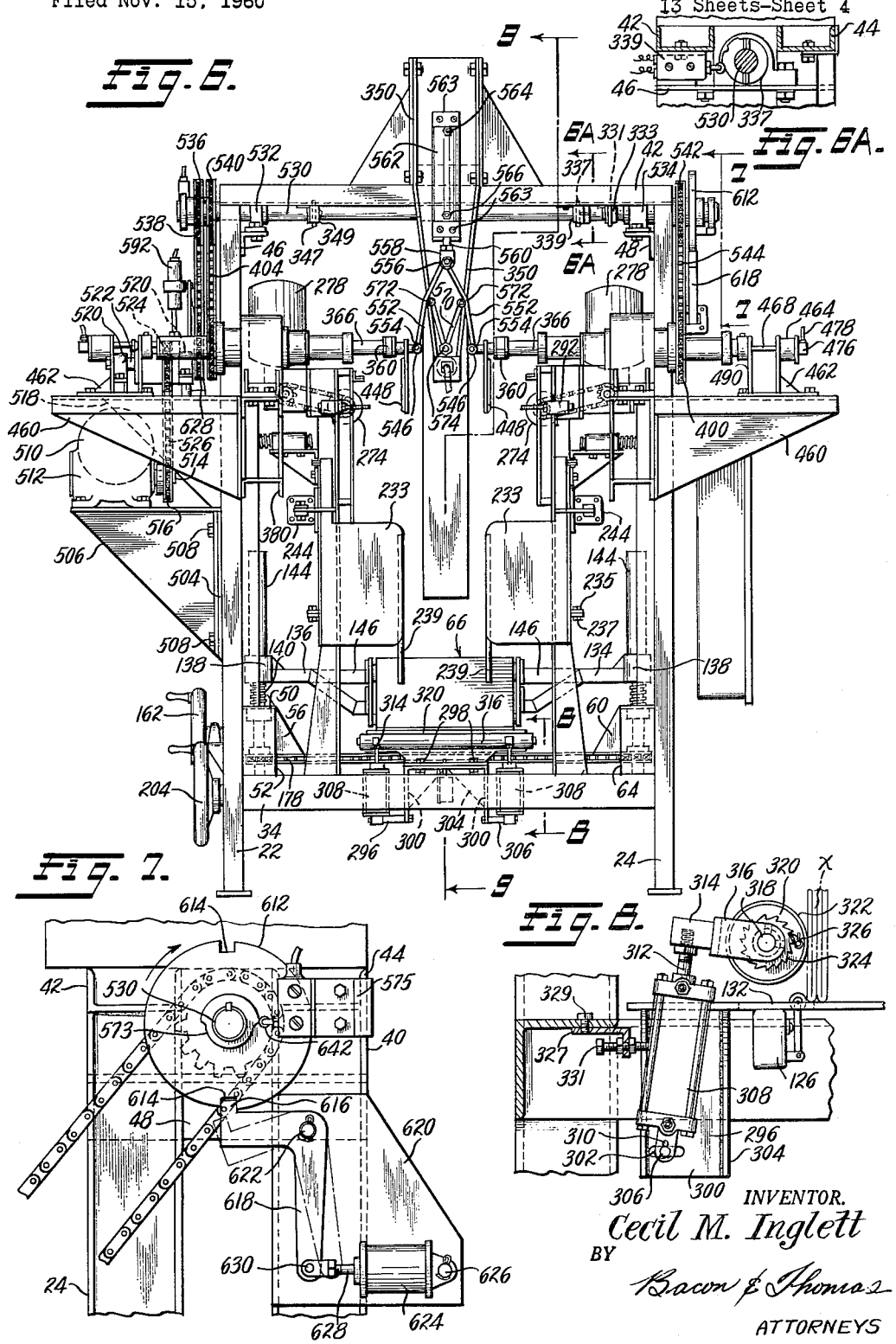

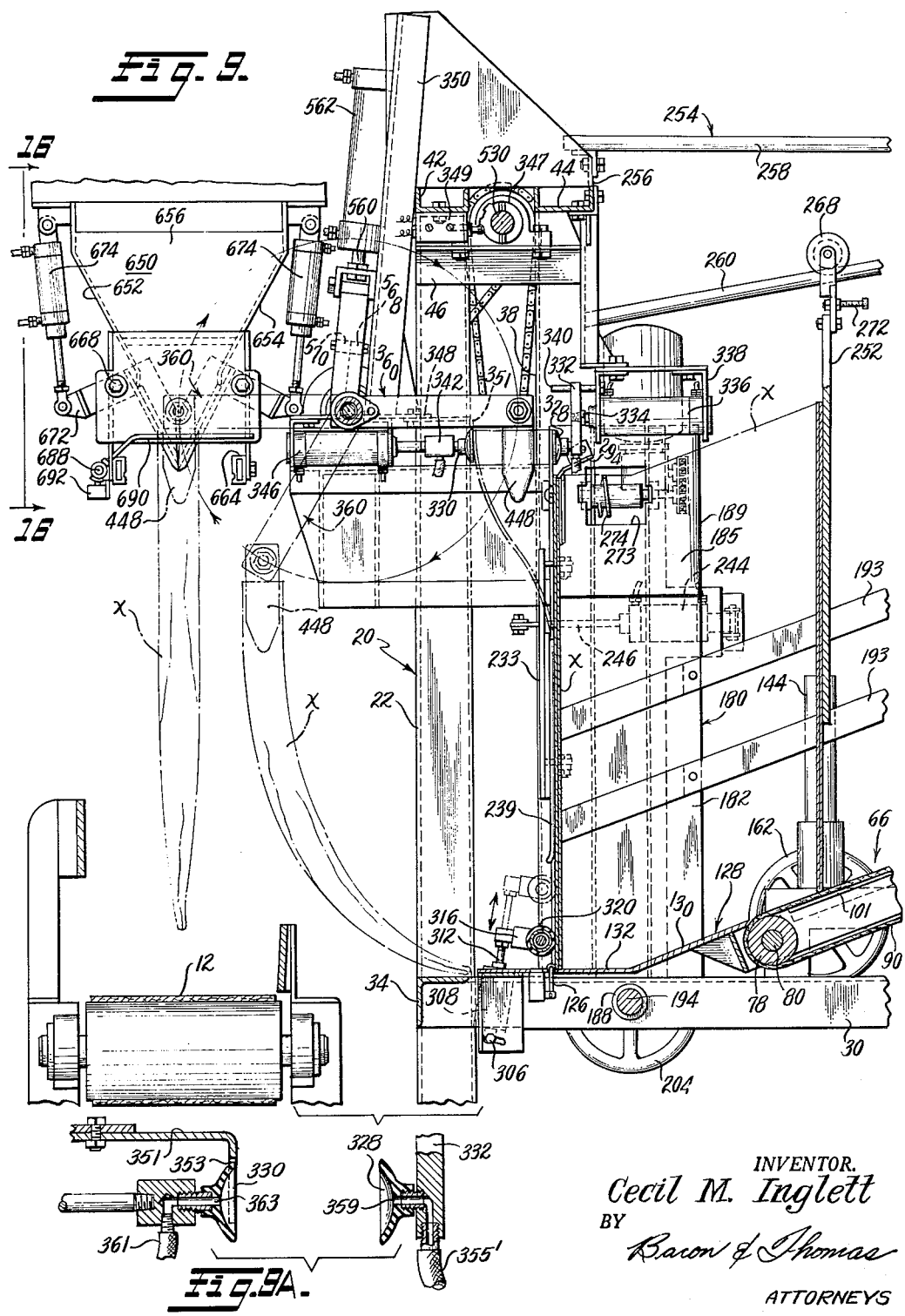

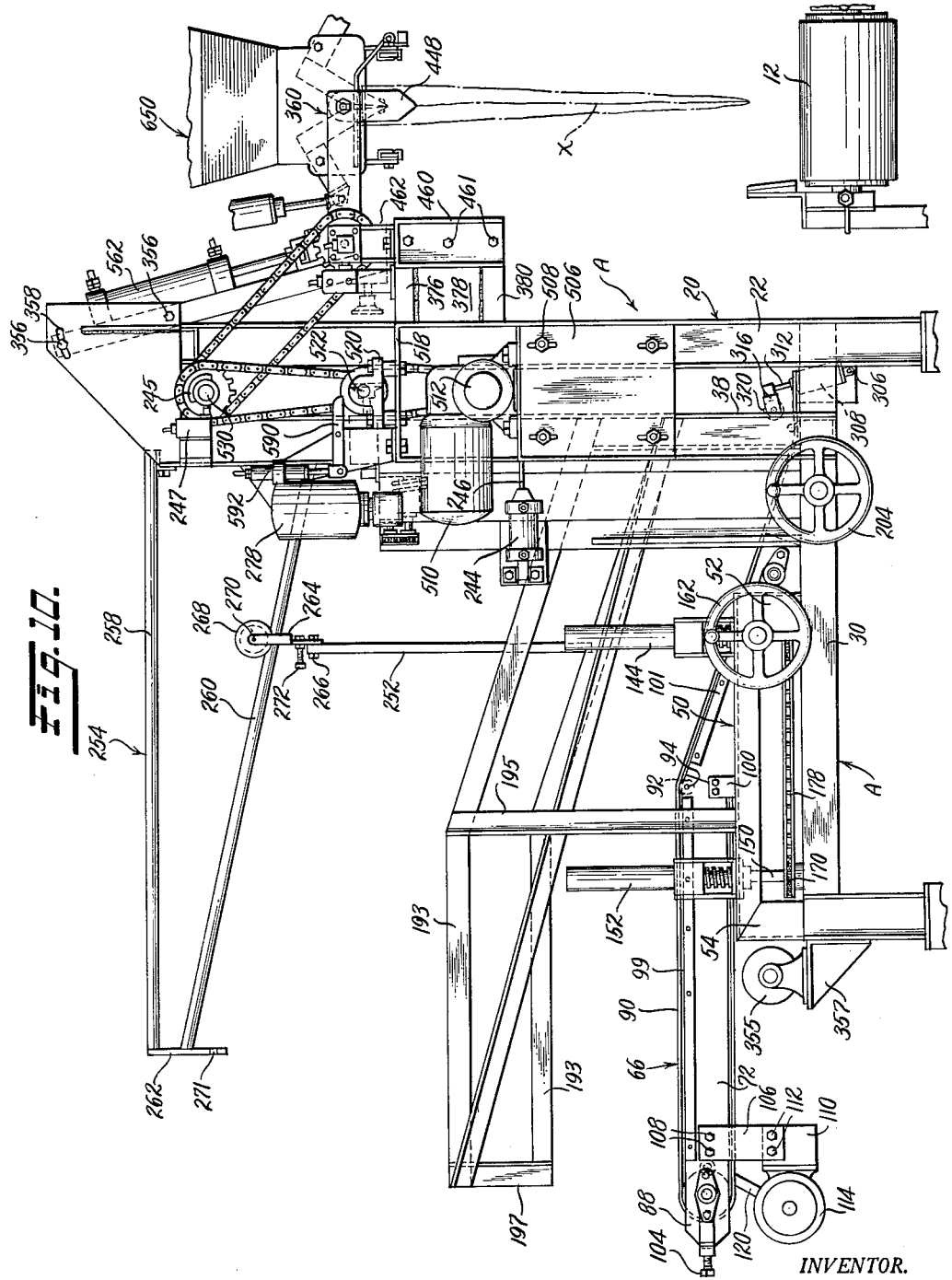

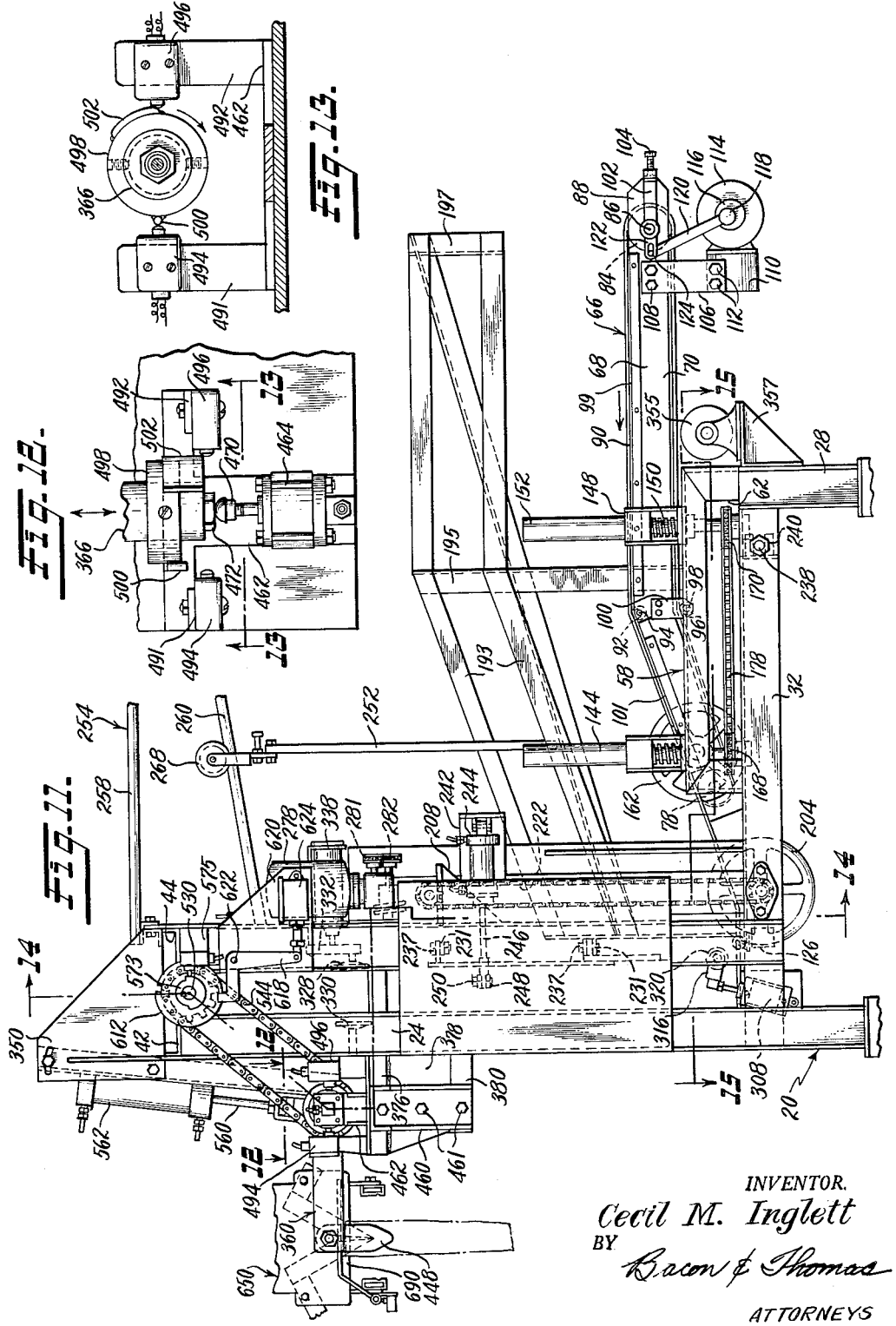

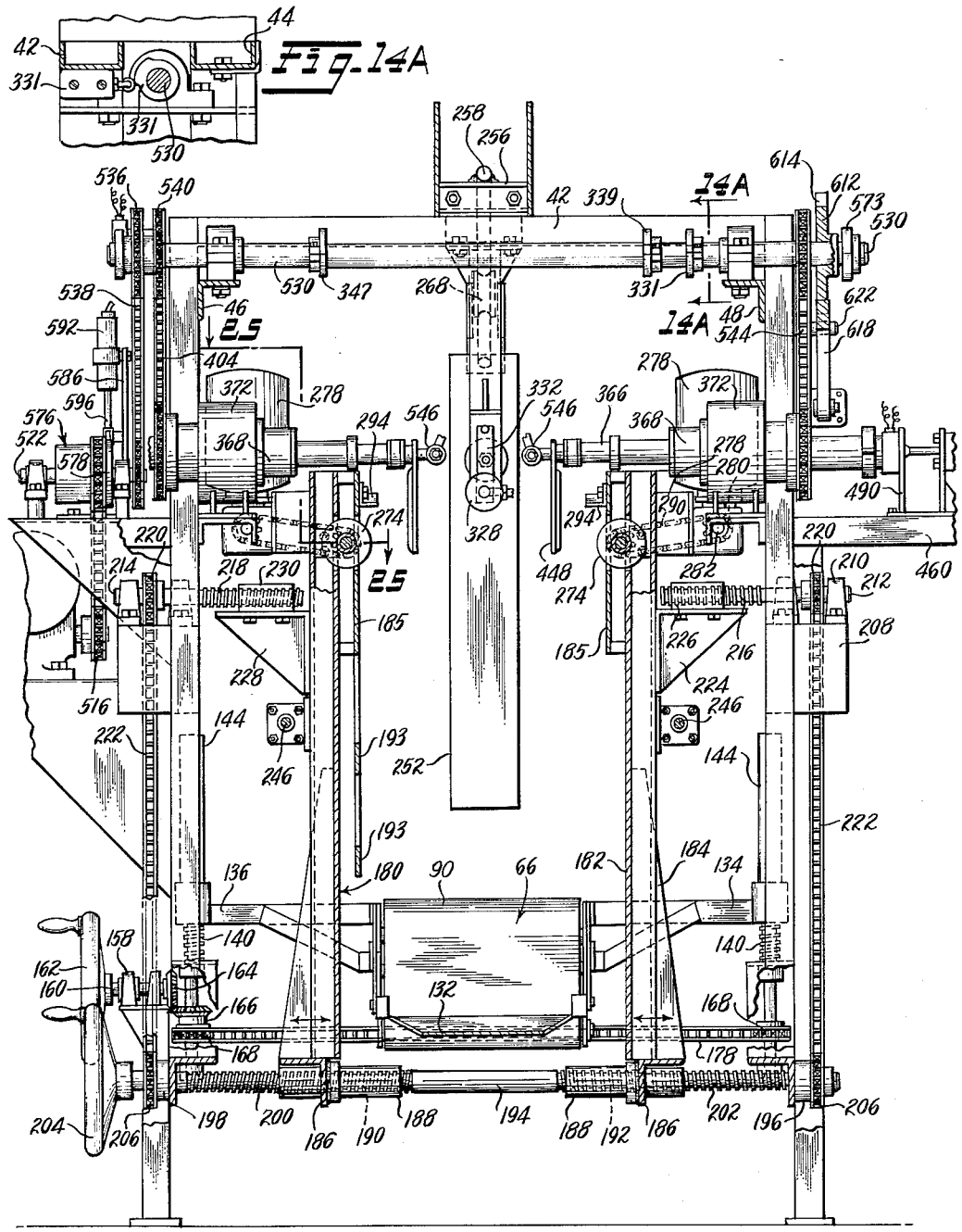

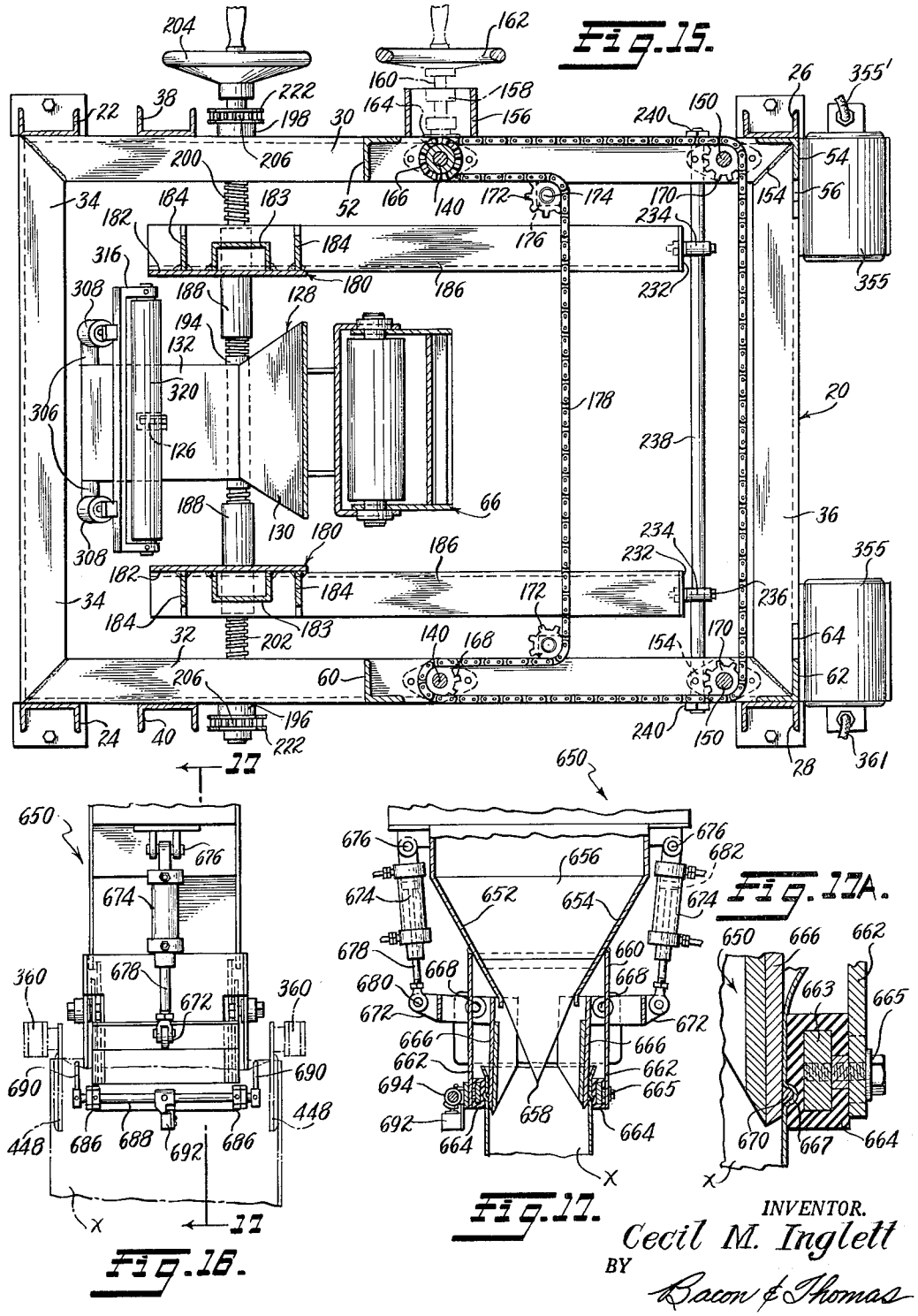

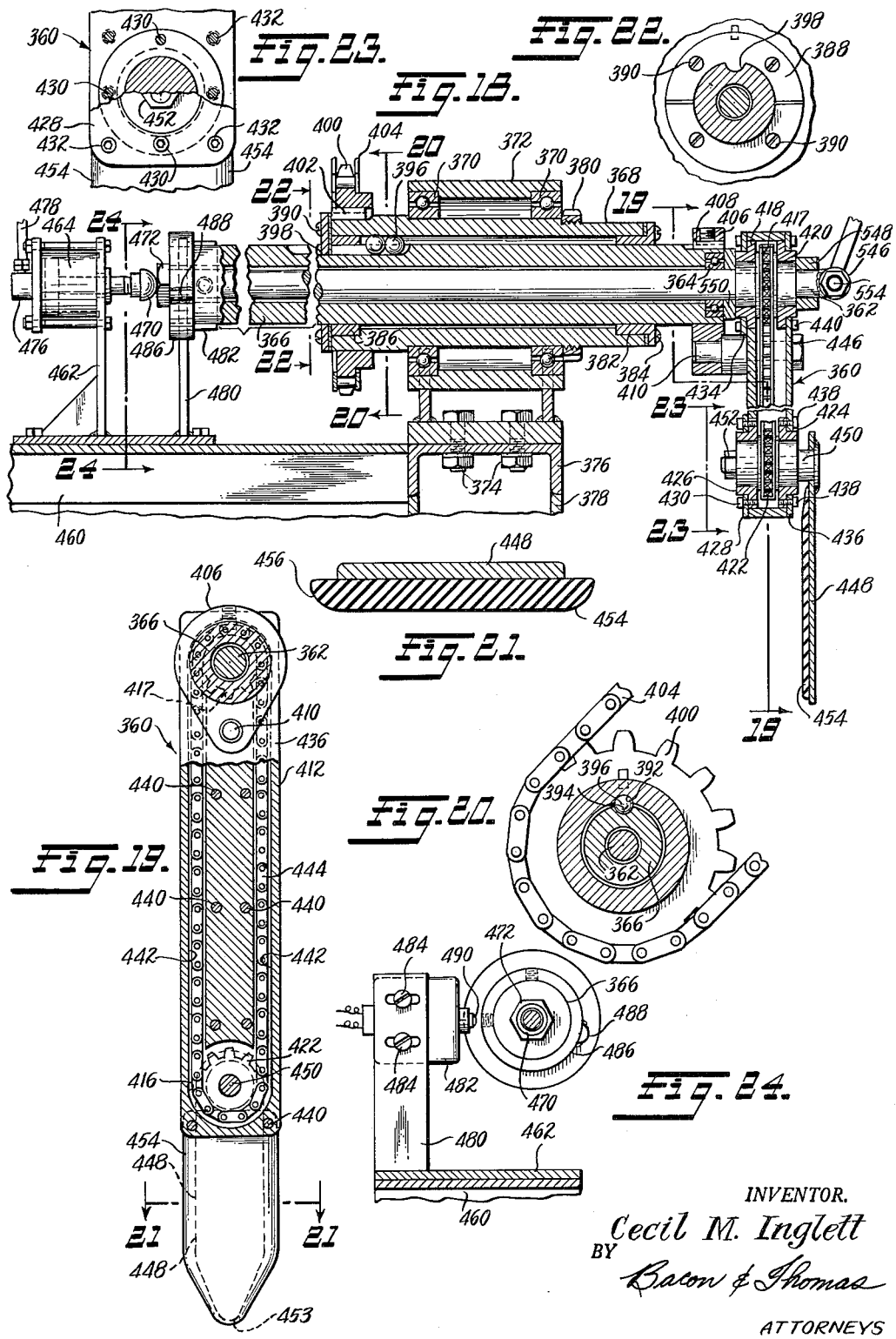

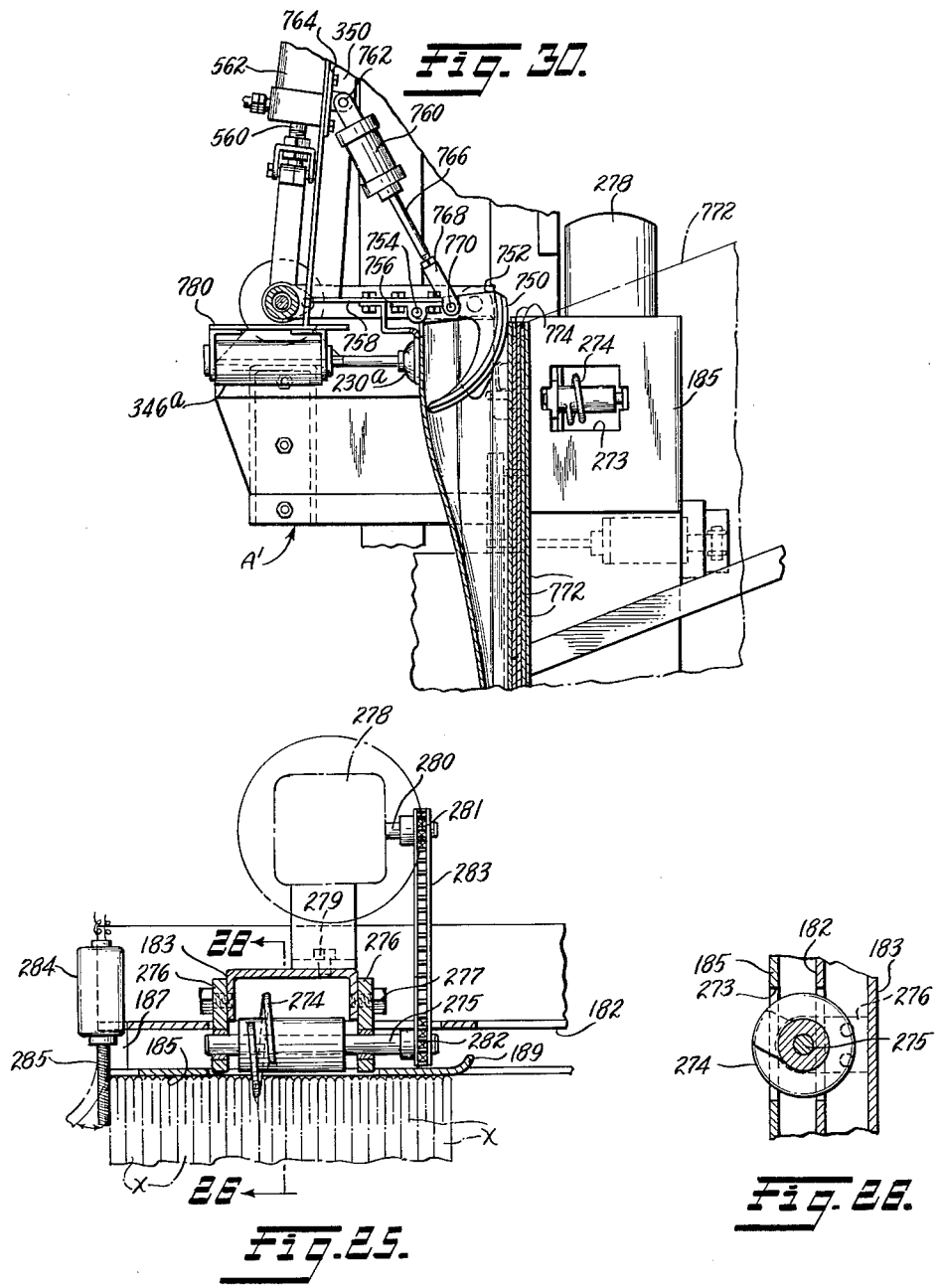

Dec. 28, 1965 C. M. INGLETT 3,225,514
AUTOMATIC BAG-HANGING AND BAG-FILLING APPARATUS
Filed Nov. 15, 1960 13 Sheets-Sheet 12

INVENTOR.
Cecil M. Inglett
BY
Bacon & Thomas
ATTORNEYS

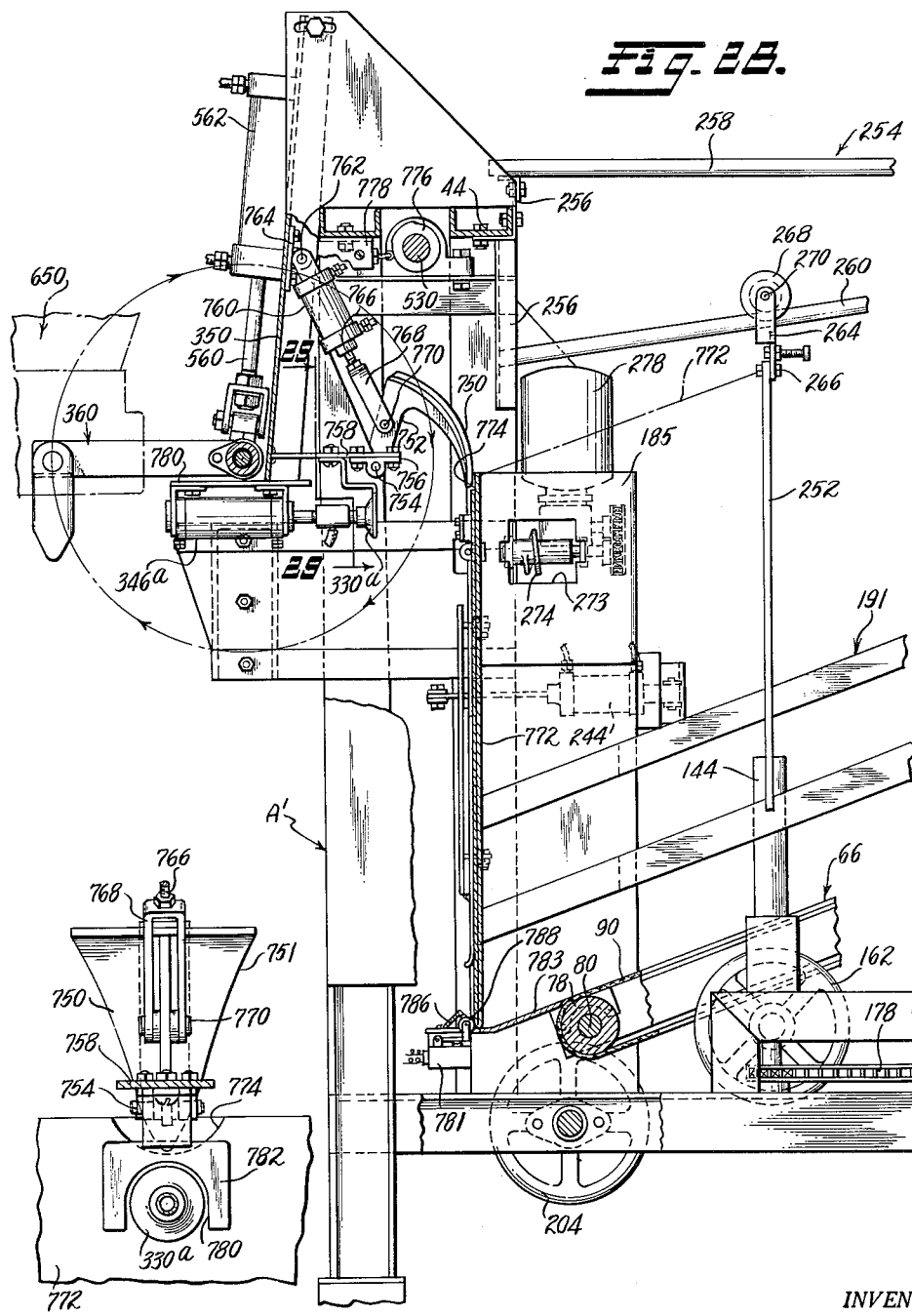

United States Patent Office 3,225,514
Patented Dec. 28, 1965

3,225,514
AUTOMATIC BAG-HANGING AND BAG-FILLING APPARATUS
Cecil M. Inglett, Augusta, Ga., assignor to Inglett & Company, Inc., Augusta, Ga., a corporation of Georgia
Filed Nov. 15, 1960, Ser. No. 69,510
29 Claims. (Cl. 53—190)

The present invention relates to an automatic bag-hanging machine and to a weighing and filling machine adapted for use therewith, the two machines being interrelated by controls for effecting operation of the same as a single unit. In the interest of maximum speed and efficiency, a bag-closing machine and a bag-top-sewing machine may be positioned along a conveyor that receives the filled bags from the bag-filling machine.

The term "automatic bag-hanging machine" or "bag hanger," as used herein, refers to an automatic machine which conveys a stack of empty bags to bag-opening and bag-hanging mechanisms that successively effect opening of the bags, and deliver the opened bags to a "bagger" or bag-filling machine in a manner such that each bag is hung on or clamped to the filling machine in a position to receive a predetermined weighed or bulk load from the filling machine.

The present bag-hanging machine comprises a conveyor upon which gusset-type and/or tube-type bags in a flat condition are manually loaded to form a stack, mechanism for effecting an initial opening of the mouth of the first, i.e., the foremost, bag in the stack, and mechanism for effecting full opening of the bag and transferring the bag in full open condition from the stack to a bag-filling machine.

The present invention contemplates different mechanisms for effecting the initial opening of the bags, one such mechanism comprising suction cups which engage the front and rear walls of the bag and pull the same apart to effect opening of the bag, and another mechanism which, in addition to using a suction cup for opening the bag, includes a mechanically operated finger or picker that cooperates with a thumb notch in the front wall of the bag and enters the bag for positively separating the front and rear walls of the bag to effect further opening thereof. When the first-mentioned bag-opening mechanism is employed, the machine is provided with a bag-elevating mechanism for raising the first bag above the remaining bags in the stack, and the suction cups are arranged above the stack and axially spaced apart, so that the upper end of the bag is raised to a position between the cups. In this manner, the suction cups can be moved toward and positively engage the front and rear walls of the raised bag and be moved apart to separate the walls and thus effect the initial opening of the bag.

Irrespective of which type of mechanism is employed for effecting the initial opening of the bag, the present invention contemplates inserting bag-fingers, carried by bag-arms, into the partially opened bag, and manipulation of the bag-arms to cause the fingers to move apart and apply force to the gusset or side wall portions of the bag to fully open the bag. The bag-fingers cause the mouth of the bag to assume a generally rectangular shape, and grip the inside of the bag with sufficient force to remove the bag from the stack and hold it while the bag-arms are rotated to a bag-filling machine. The bag-filling machine includes gripping and clamping elements especially designed to cooperate with the bag-arms and receive the opened bag and clamp it in position to receive a pre-weighed load. The bag-arms are controlled so that, after the bag is clamped, the bag-fingers are moved toward each other to release the bag, and the bag-arms are then rotated to a position to repeat the cycle of opening and transferring the next bag in the stack to the bag-filler.

The present bag-hanging machine includes sensing or limit switches that automatically control the operation of the conveyor to advance the bags to proper position for opening by the bag-opening mechanism. The movement of the bags is further controlled by sensing switches that are actuated by the upper end portion of the foremost bag in the stack. A sensing switch at the bottom of the stack controls the conveyor for advancing the entire stack of bags; whereas, the sensing switches controlled by the upper end of the bags control independently operable motors which drive feed screws located at opposite side edges of the bag for advancing the upper end of the bags to correct position for initial opening by the bag-opening mechanism.

One of the features of the present bag-hanging machine is that it includes a belt conveyor that can be raised or lowered, relative to the bag-opening and -hanging mechanisms, to accommodate bags of different height. It also includes stack-guide means for guiding the stack of bags on the conveyor, so that the front end of the stack is positioned centrally with respect to the bag-opening mechanism and is in proper position to receive bag-fingers carried by bag-arms which remove the bags from the stack as they are successively opened. The stack-guide means is adjustable to accommodate bags of different width.

With further reference to the conveyor, it has an inclined, forward portion, upon which the lower ends of the bags in the stack rest, whereby the stack tends, to some extent, to move forwardly by gravity down the inclined portion of the conveyor. The conveyor further includes a horizontal portion at the rear end thereof which provides storage space for additional bags, so that a substantial number of bags can be mounted on the conveyor at one time, without having the weight of all of the bags tending to urge the stack forwardly.

Another feature of the bag-hanging machine is that the bag-hanging arms rotate continuously, except for momentary pauses at 180° intervals. During one of these pauses, the bag-arms are horizontal and are actuated to move apart, so that the bag-fingers engage the bag to fully open the same, whereby, upon resumed rotation of the bag-arms, the bag-fingers remove the bag from the stack. During the other pause, at which the bag-arms are also horizontal, they are actuated to move toward each other to effect disengagement of the bag-fingers to release the bag after it has been clamped or hung on the bag-filling machine B.

Another feature of the invention is that the bag-filling machine can not operate to dump a bulk or weighed load, unless an open bag has been presented thereto to receive the load.

The principal object of this invention is to provide mechanical means for feeding, opening and applying empty bags to a bag-filling machine in a rapid and efficient manner. In this connection, it has been the practice heretofore to manually open and present bags to the bag-filling machine. Two or more operators are normally required for each machine, one to apply bags to the bag-filling machine discharge spout and at least one other to supply bags and position them in a manner most suitable and convenient to the operator applying the bags to the discharge spout. In contrast, only one operator is required for operating the present apparatus. The principal duties of such operator are merely to keep the bag conveyor loaded, and to make such adjustments of the machine as may be necessary from time to time to insure the desired speed and efficiency. It is therefore possible for one operator to handle up to four or more of the present machines due to their automatic operation, and slight physical labor required.

Another object is to provide, in apparatus of the character described, automatic means for delivering a stack of empty bags to bag-opening and -transferring mechanisms, which assure positive, successive opening of the bags in the stack, and successive delivery of the bags in an open condition to a bag-filling and bag-weighing machine.

Another object is to provide a bag-hanging machine that is capable of handling stacks of bags of different height and width.

Still another object is to provide bag-hanging and bag-filling apparatus cooperatively related, so that an open bag must be delivered by the bag hanger in proper position at the bag-filling machine to receive a bulk or weighed load before the load can be discharged from the filling machine.

A further object is to provide bag-opening means that will assure positive opening of flattened bags, including heavy bags having multi-ply walls, and of a size large enough to receive one hundred pounds of material, such as fertilizer, cement, concrete mix, et cetera.

A further object is to provide means for raising the foremost bag in a stack above the level of the remaining bags, in order to facilitate opening of the bag.

A still further object is to provide bag-opening means for use with bags having a thumb notch, including mechanical means which enters the upper end of the bag at the thumb notch to assure positive opening of the bag.

A still further object is to provide a new and useful method of opening and/or hanging a bag.

Other objects and features of the invention will be apparent from the following description taken in conjunction with the accompanying drawings, in which:

FIG. 1A is a fragmentary view, showing certain details of the scale of the bag-weigher;

FIG. 3 is a left end elevational view of the apparatus shown in FIG. 1;

FIG. 4 is a fragmentary elevational view, showing a one-revolution clutch employed in the drive mechanism for the bag-arms of the bag-hanging machine;

FIG. 5 is a fragmentary sectional view, taken on the line 5—5 of FIG. 4;

FIG. 6 is a front elevational view of the bag-hanging machine of the present invention;

FIG. 6A is a fragmentary sectional view taken on the line 6A—6A of FIG. 6;

FIG. 7 is a fragmentary elevational view of a locking cam associated with the main drive shaft of the bag-hanging machine;

FIG. 8 is a fragmentary sectional view taken on the line 8—8 of FIG. 6, showing the mechanism for elevating the foremost bag in a stack of bags;

FIG. 9 is an enlarged fragmentary sectional view through the bag-hanging machine taken on the line 9—9 of FIG. 6;

FIG. 9A is a sectional view through the vacuum cups which initially open the bags;

FIG. 10 is a left-side elevational view of the bag-hanging machine shown in FIG. 6, and including the discharge spout of the bag-filling machine;

FIG. 11 is a right-side elevational view of the apparatus shown in FIG. 10;

FIG. 12 is a fragmentary plan view of a bumping cylinder and cam located at one end of a bag-arm drive shaft;

FIG. 13 is a sectional view taken on the line 13—13 of FIG. 12;

FIG. 14 is a vertical sectional view taken on the line 14—14 of FIG. 11, particularly showing the mechanism for raising and lowering the bag conveyor, and the mechanism for operating the adjustable guides for the side edges of the bags;

FIG. 14A is a vertical sectional view taken on line 14A—14A of FIG. 14, showing the cam and switch which control the bag-elevating means;

FIG. 15 is a horizontal sectional view taken on the line 15—15 of FIG. 11, particularly illustrating details of the main frame and details of the mechanism for raising and lowering the bag conveyor;

FIG. 16 is a fragmentary front view of the discharge spout, gate mechanism, and one of the grippers of the bag-weighing and -filling machine, as viewed on the line 16—16 of FIG. 9;

FIG. 17 is a vertical sectional view taken on the line 17—17 of FIG. 16, but showing the gates open and clamping a bag in position against the grippers at the lower end of the spout during a bag-filling operation;

FIG. 17A is an enlarged fragmentary detail view, showing the cooperation between the bead on a discharge gate and the groove in the gripper for positively clamping the bag in place on the spout;

FIG. 18 is a vertical sectional view through the drive shaft and supporting bracket for the bag-arm at the left side of the bag-hanging machine;

FIG. 19 is a vertical section view taken on the line 19—19 of FIG. 18, showing the details of construction of one of the bag-arms, and the mechanism within the arm for maintaining a bag-finger carried by the arm, in a vertical position at all times;

FIG. 20 is a fragmentary vertical sectional view, taken on line 20—20 of FIG. 18, showing the driving connection between a drive sleeve and a bag-arm drive shaft;

FIG. 21 is a horizontal sectional view taken on the line 21—21 of FIG. 19, showing the rubber padding applied to a bag-finger;

FIG. 22 is a vertical sectional view taken on the line 22—22 of FIG. 18;

FIG. 23 is a fragmentary view, partially in section, of a bushing and retainer plate at the outer end of the bag-arm, as viewed on the line 23—23 of FIG. 18;

FIG. 24 is a vertical sectional view taken on the line 24—24 of FIG. 18, illustrating one of the cams and switches that controls the rotation of the main drive shaft;

FIG. 25 is a fragmentary sectional plan view taken on the line 25—25 of FIG. 14, showing the worm drive mechanism and sensing switch for controlling advancing of the upper ends of the bags in the stack;

FIG. 26 is a fragmentary sectional view taken on the line 26—26 of FIG. 25;

FIG. 28 is a vertical sectional view taken on the line 28—28 of FIG. 27;

FIG. 29 is a fragmentary vertical sectional view taken on the line 29—29 of FIG. 28, particularly showing the bracket for effecting stripping of the bag from the vacuum cup after the initial opening of a bag; and FIG. 30 is a fragmentary view similar to FIG. 28, but showing a bag opened by the cups and the picker positioned within the mouth of the bag.

Figure 1:
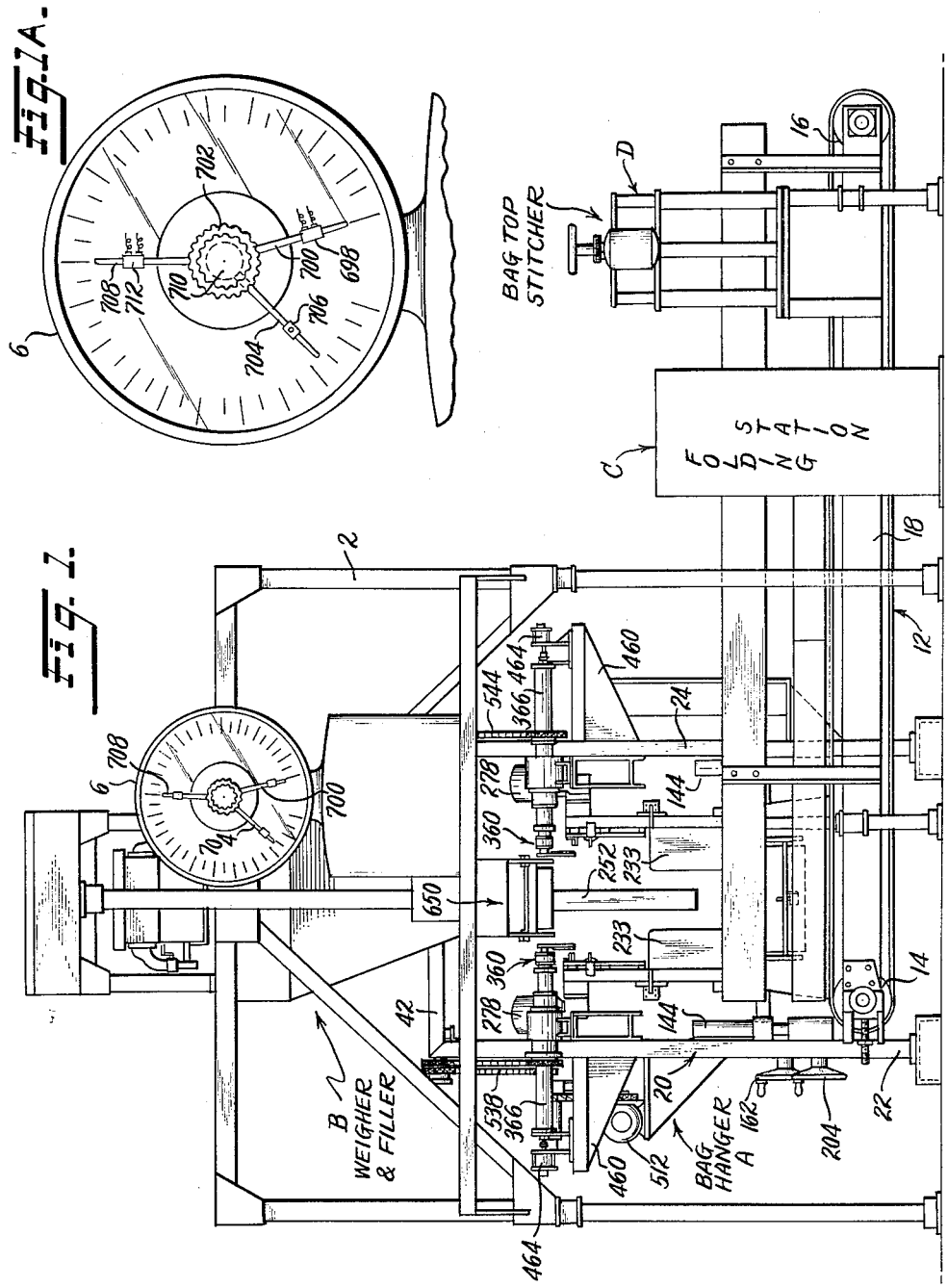
FIG. 1 is a front elevational view diagrammatically illustrating the relationship between the present bag-hanging and bag-weighing and -filling apparatus, and a bag-folder and bag-stitcher.
Figure 2:
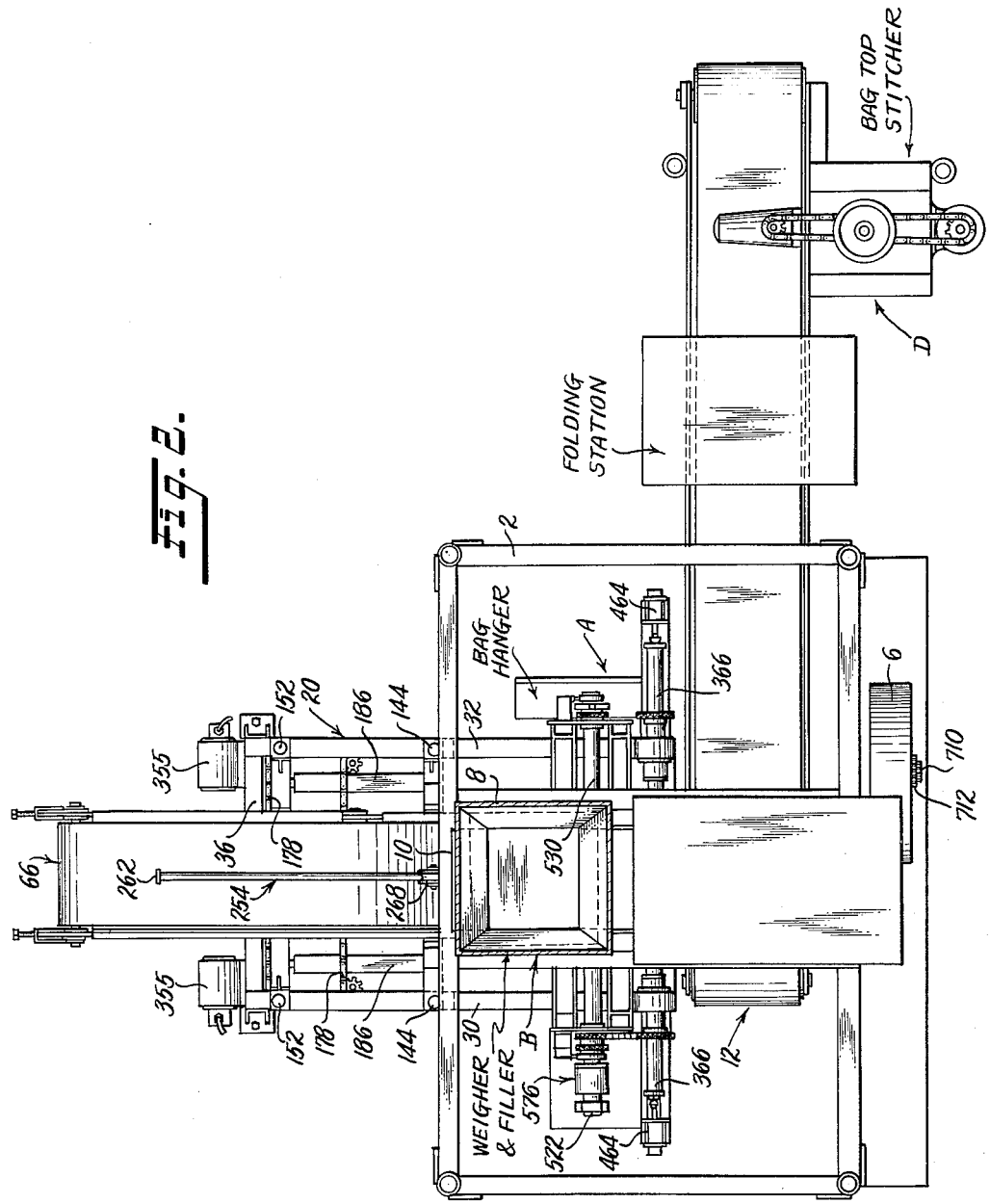
FIG. 2 is a plan view of the apparatus shown in FIG. 1.
Figure 27:
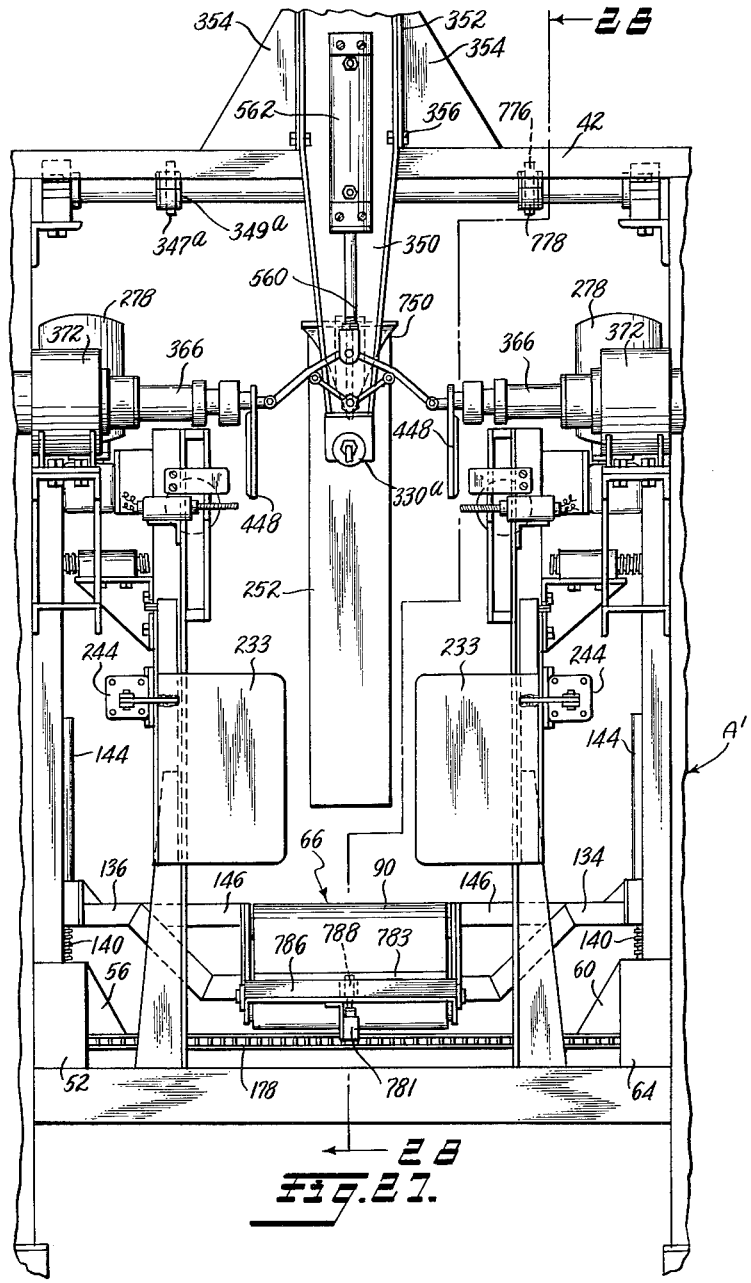
FIG. 27 is a front elevational view of a modified form of bag-hanging machine, wherein a mechanical picker is used to cooperate with the thumb notch in a bag to effect opening of the bag.

FIGS. 1, 2 and 3 of the drawings diagrammatically illustrate the relationship between the present bag-hanging machine A, a bag weigher and filler B, a bag-folder C, and a bag-top sewing machine or sitcher D. Only the discharge spout or bucket portion and certain elements of the scale of the weigher and filler B are pertinent to the present invention; in that the bag-hanging machine A functions to deliver an open bag to the discharge bucket which is especially designed to clamp the open bag in position to receive material from the hopper of the weigher, and said scale elements function to effect the side frame member 72. Internally threaded members 138 are secured to the outer ends of the brackets 134 and 136 and serve as travelling nuts. A screw 140 extends through each nut 138 and has a plane lower end that is rotatably mounted in bearings 142 secured to the main frame members 30 and 50, and 32 and 58, FIG. 14. The screws 140 extend through the nuts 138 and their upper ends are enclosed by tubular dust covers 144 mounted upon said nuts.

Straight brackets 146, FIGS. 6, 10 and 11, are secured to and extend laterally from each of the conveyor side frame members 70 and 72 at a point adjacent the conveyor idler rollers 92 and 96. A travelling nut 148 is mounted upon the outer end of each of the brackets 146 and has a screw 150 extending therethrough. Dust covers 152 enclose the upper ends of the screws 150. The screws 150 have a plain lower end portion that is mounted in brackets 154, FIGS. 10, 11 and 15, secured to main frame members 30 and 50, and 32 and 58.

A bracket 156 is mounted upon the frame member 30, FIGS. 14 and 15, and carries two bearings 158 that rotatably support a shaft 160. A hand wheel 162 is mounted upon the outer end of the shaft 160. The inner end of the shaft 160 has a bevel gear 164 mounted thereon that meshes with a bevel gear 166 secured to the screw 140 at the left side of the machine. A sprocket 168 is mounted on the screw 140 below the bevel gear 166. A similar sprocket 168 is mounted upon the screw 140 at the right side of the machine, and a sprocket 170 is mounted upon each of the screws 150. Idler sprockets 172, FIG. 15, are rotatably mounted upon stub shafts 174 carried by brackets 176, respectively secured to the frame members 30 and 32. A sprocket chain 178 extends around the sprockets 168, 170, and 172.

It will be understood from the foregoing that, when the hand wheel 162 is turned, the bevel gear 164 will drive the bevel gear 166, thereby rotating the screw 140 which, in turn, will cause the sprocket 168 to drive the chain 178 and sprockets 168, 170 and 172, and cause the screws 140 and 150 to be rotated the same amount. The screws 140 and 150 all have right-hand threads, so that, when the hand wheel 162 is rotated in one direction, the nuts 138 and 148 associated with the screws 140 and 150, respectively, will be caused to move upwardly to raise the entire conveyor 66, and that, upon rotation of the hand wheel 162 in the opposite direction, the screws 140 and 150 will be rotated in the reverse direction, causing the conveyor 66 to be lowered. In this manner, the conveyor 66 can be raised or lowered at will. Since the conveyor 66 carries its own motor 114 for driving the conveyor belt 90, the up-and-down movement of the conveyor can be effected independently of the remainder of the machine.

In addition to the adjustable conveyor 66 for adapting the machine to handle bags of different height, the machine includes bag guide means, generally identified by the numeral 180, FIGS. 6, 9, 10, 11 and 14, that is adjustable to handle bags of different widths to centralize and guide the same into proper position for opening and transfer to the bag-filling machine. Thus, the guide means 180 includes side plates 182, spaced apart and arranged parallel with the conveyor 66. The plates 182 are welded to the legs of channel members 183 and to gussets 184, both of which are welded at their lower end to angle irons 186. Each angle iron carries an internally threaded sleeve or nut 188 that is preferably welded thereto. One of the sleeves 188 has a left-hand thread 190, and the other has a right-hand thread 192. A screw shaft 194, FIG. 14, extends transversely of the machine and has one end thereof mounted in a bearing 196 secured to the angle iron 32 and its other end mounted in a bearing 198 secured to the angle iron 30. The shaft 194 has a left-hand thread 200 that mates with the thread 190 and a right-hand thread 202 that mates with the thread 192. A hand wheel 204 is mounted on the left end of the shaft 194. Sprockets 206 are mounted on the shaft 194 outwardly of the bearings 196 and 198.

A bracket 208, FIG. 14, is secured to the upright channel members 38 and 40, respectively. Bearings 210 are mounted upon each of the brackets 208 and support screw shafts 212 and 214, one at each side of the machine. The shaft 212 has a right-hand thread 216 of the same pitch as the thread 202; whereas, the shaft 214 has a left-hand thread 218 corresponding to the thread 200. A sprocket 220 is mounted upon each of the shafts 212 and 214 between the bearings 210. Sprocket chains 222 interconnect the sprockets 206 on the shaft 194 with the sprockets 220 on the shafts 212 and 214, respectively.

A bracket 224 is secured to the right side plate 182 and carries a nut 226 provided with a right-hand thread that cooperates with the thread 216 on the screw shaft 212. A similar bracket 228 on the left guide plate 182 carries a nut 230 having a left-hand thread that cooperates with the thread 218 on the screw shaft 214.

Referring now to FIGS. 14 and 26, each of the plates 182 has a bag guide plate 185 mounted thereon, but spaced therefrom by spacer elements 187. One end 189 of the guide plates 185 is curved in a direction away from the bags X in order to prevent the bags from catching thereon as they are advanced by the conveyor 66. A guide fence 191 is mounted upon the left side plate 182 and comprises guide strips 193 secured in spaced relation to plates 182 and lying in the same vertical plane as the guide plate 185. The guide strips 193 are welded to an angle iron 195, extending from the left angle iron 186, and are connected together at their rear ends by an angle iron 197.

The angle irons 186 each have a plate 232 welded to the rear end thereof, as is best shown in FIG. 15. A pair of rollers 234 is secured by studs 236 to each of the plates 232. A rod 238 extends through the vertical flange of the main frame angle irons 30 and 32 and has a nut 240 at each end thereof for holding the same in position. The pairs of rollers 234 are spaced, so that the rod 238 extends therebetween, as is best shown in FIG. 11. The foregoing arrangement lends stability to each of the plates 182 and prevents the same from turning when the shaft 194 is rotated. At the same time, the rollers 234 provide a non-frictional engagement with the rod 238 to facilitate transverse travel of the angle irons 186 on the rod 238.

It will be understood from the foregoing that, when the hand wheel 204 is turned in one direction, the stationary sleeves 188 are caused to move away from each other, thereby widening the space between the guide plates 185 to enable a wider bag to be disposed therebetween. Upon rotation of the hand wheel 204 in the opposite direction, the sleeves 188 are caused to move toward each other, thereby decreasing the space between the plates 185, so that they can function to guide a narrower bag. It will be understood that the guide fence 191 moves with the left side plate 182, so that bags can be stacked thereagainst and be moved into the space between the guide plates 185.

Referring to FIGS. 6 and 11, each of the side plates 182 and has a pair of lugs 231 welded thereto. A pair of gates or flaps 233 is also provided with corresponding lugs 235 for pivotally mounting the same upon the side plates 182 by pivot pins 237. Each of the flaps 233 carries a vertical bar 239 that engages the foremost bag in the stack to reduce friction and to prevent buckling of the bag as said bag is elevated, as will be explained later.

The side plates 182 each carry a bracket 242 upon which a pneumatic cylinder 244 is mounted. A rod 246 extends from each cylinder 244 and is pivotally connected with a lug 248 on each flap 232 by a pin 250. The pneumatic cylinders 244 are adapted to be operated in timed sequence under the control of a cam 245, FIG.

release of the filled bag, as will be described in greater detail hereinafter.

Certain details of construction of the weigher and filler B are disclosed in a patent granted to Wilfred L. Inglett 2,705,607, to which reference may be made. The bag-folder C and the bag-top stitcher D involve structure independent of the construction of the bag-hanging machine A and, for purposes of the present disclosure, need not be described.

In order to clarify the functional and operational relations between the bag-hanging machine A and the bag-weighing and filling machine B, certain parts of the latter will be briefly described.

The bag weigher and filler B comprises a frame generally identified by the numeral 2, which supports a hopper 4 normally containing a predetermined approximate weighed load of material to be deposited in a bag. The weight of the load is indicated by a scale 6 mounted on frame 2. The material to be weighed is supplied through a chute 8, which delivers the same to a conveyor 10 for discharge into the hopper 4. The hopper 4 is disposed directly above one end of a continuously driven belt conveyor 12, upon which the filled bag is dropped, as will be explained more fully hereinafter, whereby the filled bag is carried by the conveyor from a position below the hopper and presented to the bag-folder C and then to the bag-top stitcher D.

The belt conveyor 12 includes a first roller 14, disposed to the left of a center line passing through the hopper 4, as viewed in FIG. 1, and a second roller 16 located at a point beyond the bag-top stitcher D. The rollers 14 and 16 are mounted upon a suitable conveyor framework 18, the details of which form no part of the present invention.

The details of the bag hanger A are best shown in FIGS. 6, 9, 11, 14 and 15, to which reference is now made.

The bag-hanger A comprises a frame of structural elements welded together and generally identified by the numeral 20. More specifically, the frame 20 includes upright channels 22 and 24, the lower ends of which serve as supporting legs located at the left and right front corners of the machine, respectively. Vertical channels 26 and 28 correspondingly serve as left and right rear corner legs for the machine. The left legs 22 and 26 are connected by a horizontal angle iron 30, FIG. 15, and the right front and rear legs 24 and 28 are connected by a similar angle iron 32. The front legs 22 and 24 are connected by an angle iron 34, which is also joined to the ends of angle irons 30 and 32. The rear legs 26 and 28 are connected by an angle iron 36, which is also connected to the ends of the angle irons 30 and 32.

A channel 38 extends parallel with the channel 22 and is welded at its lower end to the angle iron 30, and a similar channel 40 extends parallel with the channel 24 and is welded at its lower end to the angle iron 32. The upper end of the channels 22 and 24 are welded to the base of a horizontal channel 24, FIGS. 6 and 9, and the upper end of the channels 38 and 40 are welded to the base of a horizontal channel 44. The channels 22 and 38 are welded to angle iron 46 located adjacent the channels 42 and 44, and the upper portion of the channels 24 and 40 are similarly connected together by an angle iron 48, FIGS. 6 and 7.

An inverted U-shaped frame member 50, FIG. 3, comprising two vertical and one horizontal angle iron components, has one end component 52 welded to the top of the angle iron 30, FIG. 15, and the other end component 54 welded to the angle iron 36. The end component 54 is braced by a triangular gusset 56, FIGS. 6 and 15, welded thereto and to the angle iron 36. A similar inverted U-shaped frame member 58, FIG. 11, has one end component 60 welded to the angle iron 32, FIG. 15, and its other end component 62 welded to the angle iron 36. A gusset 64 welded to the component 62 and angle iron 65 serves as a brace for the member 58.

A belt conveyor generally identified by the numeral 66, FIG. 11, is adjustably mounted on the frame 20 by means to be described later. The conveyor 66 comprises a frame 68 including side members 70 and 72 connected together by channels 74 and 76 positioned adjacent the front and rear ends thereof. It will be noted from FIG. 11 that the side members 70 and 72 of the conveyor frame have rear portions that are disposed horizontally and forward portions that are inclined forwardly and downwardly. A roller 78 is mounted upon a shaft 80 carried by brackets 82 secured to the forward end of the side members 70 and 72. A roller 84 is mounted on a shaft 86 carried by brackets 88 at the rear end of the side members 70 and 72.

The side members 70 and 72 are slotted at their rear end to permit the brackets 88 to be adjusted lengthwise of the conveyor frame. An endless belt 90 extends around the rollers 78 and 84 and passes over a supporting roller 92 mounted on a shaft 94 carried by the conveyor frame 68 adjacent the juncture of the horizontal and inclined portions. An idler or take-up roller 96 is mounted upon a shaft 98 carried by brackets 100 secured to the outer side of the frame members 70 and 72.

A conveyor belt supporting plate 99 is mounted upon the side members 70 and 72 between the rollers 84 and 92, and another plate 101 is mounted upon said side members between the rollers 92 and 78. The plates 99 and 101 are engaged by the upper run of the belt and support the weight of the bags X stacked thereon. The proper tension is maintained in the conveyor belt 90 by brackets 102 and adjusting screws 104, which engage the ends of the frame members 70 and 72 and are operable to effect movement of the shaft 86 and roller 84 in a direction toward the rear of the machine.

Plates 106 are secured to the conveyor side frame members 70 and 72 by bolts 108, FIGS. 10 and 11. A motor supporting bracket 110 is secured to the plates 106 by bolts 112. A conveyor drive motor 114 is mounted upon the bracket 110. A crank or eccentric 116 is mounted on the motor shaft 118 and has one end of a link 120 connected thereto. The other end of the link 120 is connected to a ratchet-actuating arm 122 by a pin 124, the arm 122 being arranged to effect intermittent rotation of the shaft 86 carrying the roller 84 to slowly advance the upper run of the conveyor belt 90. The operation of the motor 114 is automatically controlled by a sensing switch 126, FIG. 9, that is normally closed in the absence of a bag X being in bag-opening position in the machine and pressing against the operating arm of said switch.

With further reference to FIG. 9, a bag slide plate 128 is connected with the forward end of conveyor frame 68 and includes an inclined portion 130 extending in the same general plane as the upper run of the conveyor belt 90, and a horizontal portion 132 which extends to a point forwardly of the foremost bag in the stack of bags being advanced by the conveyor. The switch 126 is mounted on the plate 128 and is normally held open by the forward pressure of the bags resting on said plate, so that, in the event a bag is not engaged with the arm of the switch 126, the circuit to the motor 124 is closed, whereupon the motor starts to run and slowly advances the conveyor belt 90 intermittently to maintain and continually position empty bags in proper position for opening and removal from the stack. As soon as the conveyor belt 90 has advanced the stack sufficiently to enable the foremost bag to open the switch 126, the circuit to the motor is opened and driving of the conveyor 66 is discontinued.

In order to adapt the machine to handle bags of different height, means is provided for raising and lowering the conveyor frame 68 to suit the height of the bags to be fed to the weighing machine. To this end, a bracket 134 having offset ends is secured to the forward end of 10, mounted on the main shaft 530, to permit release of the foremost bag in the stack on the conveyor 66 after said bag has been opened. A switch 247 is actuated by the cam 245 to control a conventional solenoid valve (not shown), which controls the supply of air under pressure to the cylinders 244 to open and close the flaps 233.

In addition to the inclined portion of the conveyor belt 90 tending to urge the stack of bags forwardly, means is provided to assist this function in the form of a heavy follower plate 252 (see FIGS. 9, 10, 11, 14, 15 and 28). The follower plate 252 is supported by a framework 254 comprising bracket means 256 mounted above the channel 44, and horizontal and inclined tubular elements 258 and 260, respectively, extending therefrom and interconnected at their rear end by a plate 262. A clevis 264 is secured to the upper end of the follower plate 252 by a bolt 266. A trolley wheel 268 is secured to the clevis 264 by a pin 270 and engages the upper surface of the inclined tubular element 260. It will be apparent that the trolley will tend to ride down the inclined tubular element 260 by gravity, and, in this manner, the follower plate 252 will apply a continuous forward force on the stack of bags on the conveyor 66. A screw 272 mounted on the clevis 264 is engageable in a notch 271, FIG. 10, in the plate 262 to hold the follower plate 252 out of the way during the loading of bags on the conveyor 66.

While the conveyor 66 and the slide plate 128, FIG. 9, assure forward movement of the lower end of the stack of bags, the machine also includes means for assuring that the upper ends in the stack are also properly advanced, so that the foremost bag in the stack is always in proper position to be opened and removed from the stack. In order to accomplish this, each guide plate 185 is provided with a rectangular opening 273, FIGS. 6, 9, 25 and 26, to receive a feed screw 274 mounted on a shaft 275. The shaft 275 is mounted in brackets 276 secured to the legs of the channel 183 by bolts 277. A combined electric motor and reduction gear drive 278 is secured to each channel member 183 by bolts 279. The reduction gear has an output shaft 280, upon which a sprocket 281 is mounted. A sprocket 282 is mounted on the shaft 275, and a chain 283 interconnects the sprockets 281 and 282.

A sensing switch 284 is mounted upon each side plate 182 and includes a flexible actuating element 285 that projects into the path of movement of the bags X, as is best shown in FIG. 25. Each switch 284 controls the electric motor 278 associated with its plate 182. The switches 284 are normally closed and are opened by the pressure of the bags X acting on the actuator 285 to open the circuit to their respective motors. Thus, if the bag pressure on the actuator 285 is relieved through absence of bags X in proper position at the discharge end of the bag guides 185, the switches 284 will close and the motors 278 will drive the feed screws 274 to feed the bags X forwardly. As soon as the bags have been advanced sufficiently to flex the actuators 285 into a position to open the switches 284, the circuit to the motors is interrupted, and the drive of the feed screws 274 is discontinued. The feed screws 274 can function independently of each other to maintain the upper end of the stack of bags advanced and in proper position for effecting opening of the foremost bag. Each feed screw 274 consists of a thread only slightly longer than one convolution, in order to reduce friction during driving of the screw. The thread of the screw is of a pitch such that it can enter the gusset fold in the bags, as well as enter between the bags, as will be apparent from FIG. 25.

In order to further insure proper positioning of the bags at the forward end of the stack, a guide bracket 294, FIGS. 9 and 14, is mounted on the guide plates 185 at each side of the stack in a position to tend to force the bags downwardly as they pass under the brackets. The brackets 294 are located, so that one bag X can be positioned beyond the brackets, so that said brackets cannot interfere with the raising or elevating of the foremost bag in the stack by bag-elevating means, as described hereinafter.

The means of elevating the foremost bag in the stack is best shown in FIGS. 6, 8 and 9. As is illustrated, a bracket 296 is secured by bolts 298 to the horizontal portion 132 of the bag slide plate 128. The bracket 296 includes a U-shaped portion having vertical walls 300, each of which is provided with an elongated slot 302. The vertical walls 300 are braced by gussets 304. A stud 306 is adjustably mounted in each of the slots 302. The lower end of a cylinder 308 is pivotally retained on each of the studs by a cotter pin 310. Each of the cylinders 308 has a piston rod 312 extending therefrom which is threaded and secured to a boss 314 projecting from a U-shaped roller bracket 316. A shaft 318 is nonrotatably mounted on the bracket 316 and carries a roller 320 faced with friction material 322. A ratchet 324 is fixed to the shaft 318, and a pawl 326 is mounted on the roller 320 and cooperates with the ratchet 324 to permit free rotation of the roller relative to the bracket in one direction only. A bracket 327 is secured to the angle iron by bolts 329. The bracket 327 carries stop screws 331 that engage the cylinders 308 to position the same, so that the roller 320 engages the first bag with sufficient pressure to move it upwardly.

As is shown in FIG. 8, the roller friction material 322 is engaged with the front face of the first bag X in the stack. Upon admission of air under pressure into the lower end of the cylinders 308, the piston rods 312 are forced upwardly, carrying the bracket 316 and roller 320 therewith. The pawl 326 and ratchet 324 are effective at such time to prevent turning of the roller 320, so that the result is an upward movement of the bag corresponding to about a four-inch upward stroke on the roller 320. This action raises the upper end of the first bag in the stack to a height of about three-and-three-quarter inches above the upper end of the second bag in the stack to facilitate opening of the first bag, as will be explained later. The belt conveyor 66 provides the desired pressure between the bag and roller.

Upon admission of air under pressure into the upper end of the cylinders 308, the bracket 316 and roller 320 will be moved downwardly, but, since the roller is free to rotate during the downward movement of the bracket, it rolls off the first bag and engages the second bag in preparation for performing an elevating operation on the second bag at the proper time in the machine cycle. The operation of the cylinders of the bag-elevating mechanism is controlled by a cam 321, FIG. 6, mounted upon a main drive shaft 530. The cam 321 actuates a switch 333 controlling a conventional solenoid valve (not shown) that simultaneously supplies air to the cylinders 308.

Referring now to FIG. 9, the bracket 316 and roller 320 are shown in dot-and-dash lines in their raised position and in full lines in their retracted position. The first bag X in the stack is shown in a correspondingly raised position, and it will be noted that the upper end of the bag is disposed between two axially aligned, concave suction cups 328 and 330. The suction cup 328 is mounted upon the lower end of a vertical bar 332. The bar 332 is connected at the mid-point thereof with a piston rod 334 associated with a cylinder 336. The cylinder itself is mounted upon a bracket 338, which, in turn, is secured to the lower end of the bracket means 256. A guide rod 340 projects from the bracket 338 and extends through the bar 332 and prevents turning of the bar relative to the cylinder 336 to keep the cup 328 in alignment with the cup 330.

The suction cup 330 is carried by one end of a piston rod 342 associated with a cylinder 346. The cylinder 346 is mounted upon a bracket 348 which, in turn, is secured to the lower end of a linkage-supporting bracket 350 carried by the channel 42 through brackets welded to said channel and comprising parallel plates 352 and bracing gussets 354. The bracket 350 is connected to the plates 352 by bolts 356, the uppermost of which are received in slots 358, FIG. 10, formed in the plates 352. In this manner, the housing 350 is adjustably mounted, so that it can pivot about the fulcrum formed by the lower bolts 356.

The cylinders 336 and 346 are connected with a source of air under pressure, so that when air is admitted into the cylinders, the rods 334 and 342 are simultaneously drawn into the cylinders or simultaneously forced out, depending upon which end of the cylinders receives the air under pressure.

The timing of the operation of the front cylinder 346 is controlled by a cam 347, FIGS. 6 and 9, mounted on the main drive shaft 530. The cam 347 actuates a switch 349 carried by the channel 42, to control a conventional solenoid valve (not shown) for exhausting and supplying air to the opposite ends of the cylinder 346 to actuate the front cup 330. Similarly, the timing of the operation of the rear cylinder 336 is controlled by a cam 337, FIGS. 6 and 6A, mounted on the shaft 530 for actuating a switch 339 mounted on the channel 42. The switch 339 controls a conventional solenoid valve (not shown), which controls the air supply to the ends of the rear cylinder 336.

It will be noted that the cams 337 and 347 each have two rises with a depression therebetween. These cause the cylinders 336 and 346 to be operated to effect repeated engagement of the cups with a bag. Thus, when air is admitted into the ends of the cylinders 336 and 346 remote from the suction cups 328 and 330, the cups are quickly forced toward each other, so that the cup 328 engages the rear wall of the bag, and the cup 330 engages the front wall of the bag. Upon exhausting the air from the remote ends of the cylinder and introducing air under pressure into the adjacent ends of the cylinders, which occurs when the depression on the cams 337 and 347 are engaged with the switches 339 and 349, the suction cups 328 and 330 are caused to move apart, and, in doing so, cause the front and rear walls of the bag to become separated, thereby effecting opening of the bag. This action is momentary, and the high part of the cams 337 and 347 then actuate their associated switches to quickly move toward each other and then to again move apart, this time remaining apart for a longer interval. The described extra "shot" given to the cups assures positive bag opening.

The stroke of the piston rod 342 is much greater than that of the piston rod 334, so that the front wall of the bag is moved forward a substantial distance, as illustrated by the dot-and-dash lines of FIG. 9. After the bag is partially opened by the suction cups 328 and 330, it is conditioned to be fully opened and then removed from the stack, and this is accomplished by the operation of a bag-opening and -transferring mechanism that will be described later. The bag is stripped from the front cup 330 just prior to full opening, by a bracket 351, FIGS. 9 and 9A, which partially surrounds said cup and restrains the bag as the cup moves through an arcuate recess 353 in said bracket. It has been found unnecessary to provide a bracket for stripping the bag from the rear cup 328, since the bag-transferring mechanism easily does this.

In some machines, it may be desired to evacuate the cups 328 and 330 by suction, and, to this end, vacuum pumps 355, FIGS. 10, 11 and 15, are mounted upon brackets 357 secured to the rear legs 26 and 28, respectively, of the main frame 20. The vacuum pumps 355 are preferably in continuous operation when the machine is being used. One vacuum pump 355 has one end of a tube 355′ connected thereto, the other end of which is connected with the vacuum cup 328, FIG. 9A, which has a passageway 359 leading to the concave portion of the cup. The other vacuum pump 355 has one end of a tube 361 connected thereto, the other end of which is connected with the cup 330. This cup also has a passageway 363 leading therethrough to the concave portion thereof.

As has been previously stated, the vacuum pumps operate continuously, so that a suction force is always available within both of the cups 328 and 330. This insures a positive gripping of the front and rear walls of the bag by the suction cups to effect the initial opening of the bag.

The final bag-opening and -transferring mechanism is best shown in FIGS. 6, 9 and 18 to 23, inclusive, and comprises two bag-arms 360, which are identical in construction and are driven by similar means. Hence, the description of one will suffice for both. Referring more particularly to FIG. 18, the bag-arm 360 is carried by a nonrotating, but axially movable, shaft 362 that is supported on roller bearings 364 within a hollow bag-arm drive shaft 366. The shaft 366 extends through a drive sleeve 368 that is mounted upon ball bearings 370 mounted in bearing housing 372. Each bearing housing 372 is secured by bolts 374 to a support comprising an upper channel 376, plates 378 and a lower channel 380, all welded together and welded to the upright channels 22–38 and 24–40. The sleeve 368 is retained in assembled relation with the bearings 370 and housing 372 by a lock nut 381 threaded onto the sleeve. A bushing 382 surrounds the drive shaft 366 at the right end of the sleeve 368 and is fastened by screws 384 to the said end of the sleeve 368, as viewed in FIG. 18. A bushing 386 is disposed between the left end of the sleeve 368 and the drive shaft 366. A split retaining ring 388, FIG. 22, retains the bushing 386 in the sleeve 368 and is secured to said sleeve by screws 390.

The sleeve 368 has a groove 392 that is semi-circular in cross-section, as shown in FIG. 20. The drive shaft 366 has a similar groove 394, which confronts the groove 392 within the sleeve 368. Steel balls 396 are disposed in the grooves 392 and 394 and provide a drive connection therebetween. At the same time, the balls 396 permit longitudinal movement of the drive shaft 366 within the sleeve 368, for a purpose that will be described later. One part of the split retaining ring 388 has a projection 398 that is of the same shape as the groove 394 and projects into the groove to prevent dust or other foreign matter from entering the portion of the groove within the sleeve 368. A sprocket wheel 400 is secured to the sleeve 368 by a key 402. A chain 404 extends around the sprocket 400. The chain 404 is driven by means that will be described later.

A drive dog 406, FIG. 18, is secured to the drive shaft 366 by a key 408. A stud 410 has one end thereof fixed in the dog 406, and its other end projects through an opening in the bag-arm 360 to provide a driving connection between the shaft 366 and said bag-arm. Each of the bag-arms 360 includes a body portion 412, FIG. 19, having an opening 414 at one end thereof and a similar opening 416 at the opposite end. A sprocket 417 is received in the opening 412 and is keyed on the stationary shaft 362. The sprocket 417 has hub portions that extend into bushings 418 and 420, respectively. A rotatable sprocket 422, generally similar to the sprocket 417, is received in the opening 416 and has hub portions that extend into bushings 424 and 426. The bushing 426 is nonrotatably secured to a retainer plate 428 by screws 430, FIG. 23, and the retainer plate itself is secured to the body 412 by screws 432. The bushing 418 is secured in the body 412 in a similar manner by a retainer plate 434. The bushing 424 is secured to a cover plate 436 by screws 438, which is, in turn, secured to the body 412 by screws 440. The bushing 420 is similarly secured to the cover plate 436.

The body 412 has two longitudinally extending grooves 442, as best shown in FIG. 19. The grooves 442 extend from the opening 414 to the opening 416 and provide channels to receive a sprocket chain 444 that extends around the sprockets 417 and 422. The stud 410 extends through the body 412 and cover plate 436, and a cap screw 446 mounted therein retains the bag-arm 360 in assembled relation with the drive dog 406. A bag-finger 448 is brazed to the head of a stud 450 that extends into and is nonrotatably connected with the sprocket 422 by a nut 452. The bag-finger 448 tapers to a rounded point at its lower end, as indicated at 453, FIG. 19, and is of less width than the bag-arm 360. A sheet of rubber or other friction material 454 of a shape generally corresponding to that of finger 448, but of a width greater than the finger, is permanently bonded thereto. The peripheral edge of the rubber sheet 454 is rounded as indicated at 456, FIG. 21. In assembling the bag-arm 360, the sprockets 417 and 422, and the chain 442 are arranged so that, when the body 412 is vertical, the bag-finger 448 also is vertical.

It will be understood from the foregoing description that, when the drive shaft 366 is rotated, the bag-arm 360 rotates with the shaft, with the result that the chain 442 maintains the bag-finger 448 in a vertical position at all times, regardless of the angular position of the bag-arm 360. This relationship is illustrated in FIG. 9, wherein the bag-arm 360 is shown in full lines in one position and in dot-and-dash lines in two other positions. The purpose of this feature is to assure that the bag-fingers 448 are always vertical and extend downwardly from the bag-arms 360 to enable the same to enter the open mouth of the bag, as shown in FIG. 9, when the bag-arm 360 is in the position shown in full lines, and so that said fingers will remain vertical as the bag-arms rotate clockwise, as viewed in FIG. 9, to remove the front bag from the stack and transfer it through the intermediate and final positions of said bag-arms shown in dot-and-dash lines, and to be withdrawn from the bag at the final position in which the bag is delivered to the spout of a bag-filling hopper.

It will be noted from FIG. 6 that the bag-arm drive shafts 366 are axially aligned and that the bag-arms 360 and bag-fingers 448 confront each other. The shafts 366 are also arranged so that they rotate the bag-arms 360 in synchronism, as will appear later.

Referring to FIGS. 10 and 11, the supports provided by the channels 376 and 380 and the plates 378 project forwardly of the upright channels 22 and 24 at the front of the machine. A bracket 462 is mounted upon each support 460 and carries a bumper cylinder 464 containing a piston 466 and a rod 468 projecting from the piston and carrying an adjustable rounded knob 470 that engages with a cap screw 472 mounted in the adjacent end of the nonrotatable shaft 362 (see FIG. 18). Operating fluid is admitted into one end of the cylinder 464 through a fitting 476 having a supply conduit 478 connected thereto.

The purpose of the bumper cylinders 464 is to quickly move the pistons 466 toward each other, with the result that the knobs 470 produce a corresponding movement of nonrotatable shafts 362. As will be understood, any longitudinal movement imparted to the shafts 362 will produce a corresponding movement of the bag-arms 360 and bag-fingers 448. The aforedescribed movement of the bag-arms 360 toward each other occurs after an open bag has been delivered to the filling machine B, at which time it is desirable to release the bag and to withdraw the fingers 448 from the bag, while the bag is clamped at the filling hopper 4, all as will be made clear hereinafter.

Referring to FIGS. 18 and 24, a plate 480 is welded in an upright position to the bracket 462 at the left side of the machine. A switch 482 is secured to the plate 488 by screws 484. A cam 486 is fixed to the drive shaft 366 and has a projection 488 on its periphery that is adapted to engage a button 490 to actuate the switch 482.

Two plates 491 and 492, FIGS. 6, 12 and 13, are welded to the bracket 462 at the right side of the machine. Plate 491 has a switch 494 mounted thereon; whereas, plate 492 has a switch 496 mounted thereon, with the switches disposed on diametrically opposite sides of the arm drive shaft 366. A cam 498 is fixed to the shaft 366 and carries a projection 500 for actuating the switch 494 and a relatively long and wide projection 502 for actuating the switch 496. It will be noted from FIG. 12 that the projections 500 and 502 are mounted upon the cam 498 in longitudinally offset relation.

In FIG. 12 the shaft 366 is illustrated in the position that it occupies as a result of being "bumped" or actuated by the cylinder 464. In other words, the shaft 366 is shown in the position wherein the bag-arm 360 and the bag-finger 448 associated therewith will have been moved inwardly to release the bag at the bag-filling hopper 4. In such position, the projection 500 is clear of both switches 494 and 496; whereas, the projection 502 is engaged with the operating button of the switch 496.

The switches 482 and 494 control means for locking the main drive shaft 530 upon completion of each half revolution thereof; whereas, the switch 496 controls mechanism for moving the bag-arms 360 toward each other during the movement thereof toward their bag-pickup position shown in full lines in FIG. 9, all as will be described later.

The means for driving the main shaft 530 of the bag-hanging machine will now be described.

Referring to FIGS. 6 and 10, the vertical channels 22 and 38, at the left side of the machine, have a plate 504 welded thereto, to which a motor bracket 506 is adjustably secured by bolts 508. An electric motor 510 is mounted upon the bracket 506 and includes a reduction gear 512 having an output shaft 514 upon which a sprocket 516 is mounted. A bracket 518 is mounted upon the uprights 22 and 38 above the bracket 506 and carries two bearings 520, in which a countershaft 522 is mounted. A sprocket 524 is mounted on the shaft 522 and is driven by a chain 526 from the sprocket 516 on the reduction gear shaft 514. A sprocket 528 is also mounted on the shaft 522. A main drive shaft 530 is mounted at one end in a bearing 532 secured to the angle iron 46, and at the other end in a bearing 534 secured to the angle iron 48, FIG. 6. A sprocket 536 is mounted on the main shaft 530 and is driven from the sprocket 528 by a chain 538. A sprocket 540 is mounted on the left end of the main shaft 530, and a similar sprocket 542 is mounted adjacent the right end of said shaft. The sprocket 540 is connected by the chain 404 with the sprocket 400 on the arm drive sleeve 368. The sprocket 542 is connected by a chain 544 with the corresponding sprocket 400 on the arm drive sleeve 368 at the right side of the machine. Thus, it will be understood that the bag-arm drive shafts 366 are driven by the motor 510 through the sprocket 516, chain 526 and sprocket 524 to the countershaft 522, through the countershaft to sprocket 528, chain 534 and sprocket 536 to the main drive shaft 530, and from said main shaft through sprocket 540 and drive chain 404 to the sprocket 400, the arm drive shaft 366 at the right side of the machine being driven from the main shaft 530 through the sprocket 540, chain 544 and sprocket 400.

In the operation of the present machine, the bag-arms 360 are driven clockwise, as viewed in FIG. 9, the drive being momentarily interrupted at the end of the 180° arcs when said arms are in the horizontal position shown in full and dot-and-dash lines. The arm drive is interrupted at the full line position of the arms 360 to permit the arms to be moved apart after the fingers 448 enter a partially open bag, to further open the bag and to cause the fingers to engage the side walls of the bag with sufficient force to remove the bag from the stack and transfer it to a position under the filling hopper 4. The cycle of operation of the present machine further contemplates momentarily stopping the rotation of the bag-arms 360 in the horizontal position shown in dot-and-dash lines, wherein the bag will have been presented by the bag-fingers 448 to the bag-filling hopper 4. Stopping of the bag-arms 360 in the last-mentioned position is desirable to enable the bag-fingers 448 to be moved toward each other slightly to release the bag and permit the fingers to be withdrawn from the bag, while the bag is clamped at the filling hopper. The bumper cylinders 464 previously described effect the last-mentioned movement of the bag-fingers 448, thereby causing the shafts 362 to be moved toward each other.

The outward movement of the bag-arms 360, when the arms are in full line position shown in FIG. 9, is accomplished by means which will now be described. The interruption of the drive of the bag-arms 360, when in the full line and dotted line positions, respectively, shown in FIG. 9, is accomplished through a one-revolution clutch and cam lock means, which will be described later.

A short piece of tubing 546, FIGS. 6 and 18, is welded to the inner end of each of the nonrotating shafts 362. A spacer 548 is positioned between the tubing section 546 and the hub of the adjacent sprocket 417. A suitable spacer 550 is positioned on the shaft 360 between the bushing 418 and the adjacent end of the arm-drive shaft 366. Thus, all play is eliminated between the tubing section 546 and the arm-drive shaft 366.

A first pair of links 552 has one end of each link connected with a tube section 546 by a pivot pin 554. The other end of the links 552 are connected together by a common pin 556, which also connects them to a clevis 558 mounted upon the outer end of a piston rod 560 extending from a cylinder 562. The cylinder 562 is mounted by bolts 563 upon the adjustable housing 350, previously referred to. The piston rod 560 is connected with a piston (not shown) in the cylinder 562, and operating fluid is applied to the upper end of the cylinder through a fitting 564 and to the lower end of the cylinder through a fitting 566.

Each of the links 552 includes end portions that are linearly offset, and a section of tubing 568 is welded to each link at the juncture of the offset portions. One end of a second pair of links 570 is connected by a pin 572 with the tubing 568. The opposite end of the links 570 are interconnected by a common pin 574 fixedly mounted on the bracket 350.

The relationship of the pivots and the length of the links interconnecting the piston rod 560 with the nonrotating shafts 362 is important, in order to assure the proper functioning of the bag-arms 360. Thus, it will be noted from FIG. 6 that the axis of the pivot pins 554 connecting the links 552 with the shafts 362 lie in the same horizontal plane, and that this plane intersects the axis of the common pivot pin 574 connecting the links 570 with the bracket 350. It is also important to note that the pivot pins 572 have their axis located on a line passing through the axis of the pivot pins 554 and the common movable pivot 556. The latter relationship is obtained by providing an appropriate bend in the links 552.

It will also be noted that the distance from the pivot pins 554 to the pivot pins 572 is equal to the distance from the pivot pins 572 to the common pivot pin 556. The foregoing proportions and relation of parts assure that the nonrotating shafts 362 will move toward and away from each other equal amounts without any tendency on the operating mechanism to move the shafts 362 out of axial alignment. This eliminates all up or down thrust on the bag-arms 360.

FIGS. 4 and 5 illustrate a conventional one-revolution clutch 576 that is associated with the countershaft 522. This clutch includes a cam 578 that is secured to the shaft 522 and has a radial step 580 formed on its periphery. A clutch pawl bracket 582 is mounted upon the motor bracket 506 by bolts 584 and includes an upright portion 586 having a pin 588 mounted thereon that serves as a pivot for a clutch pawl 590. One end of the pawl 590 is adapted to cooperate with the cam 578 to prevent the driven element of the clutch 576 from rotating. An air-operated cylinder 592 is mounted on the upright portion 586 by a clamp 594. The cylinder 592 has a piston rod 596 extending therefrom which is connected by a pin 598 to one end of the pawl 590. The piston rod 596 is connected with a piston 599 within the cylinder 592, and a spring 600 within said cylinder continuously urges the piston 599 upwardly, with the result that it tends to maintain the pawl 590 in contact with the cam 578 at all times. Operating fluid is admitted into the upper end of the cylinder 592 through a conduit 602. It will be understood that, upon the admission of operating fluid, the piston 599 is caused to move downwardly to disengage the pawl 590 from the cam step 580 to permit the clutch 576 to rotate the shaft 522 through one complete revolution. The admission of air to the cylinder 592 is controlled by the cam 486, FIG. 24, on the right-hand arm drive shaft 366. This cam has a projection 488 that is adapted to engage the actuating button 490 of the switch 482 to complete the circuit to a conventional solenoid valve (not shown) for controlling the supply and exhaust of air to the clutch pawl operating cylinder 592. It will be apparent that, upon actuation of the switch 482, the pawl 590 is momentarily disengaged from the step 580 to release the clutch for one revolution of the shaft 522, and that, upon exhausting air from the cylinder 592, the spring 600 will hold the pawl 590 in contact with the cam 578 until it is engaged by the step 580. Further rotation of the shaft 522 is prevented until the pawl 590 is again released.

The timing of the machine is such that the clutch 576 is released to start driving the bag-arms 360 from their dot-and-dash position toward their full line position shown in FIG. 9. The main shaft 530 is unlocked at the same time by means described later.

Referring now to FIG. 7, the main shaft 530 has a locking cam 612 fixed thereon, said cam having diametrically disposed notches 614 formed in its periphery. The notches 614 are adapted to be successively engaged by a projection 616 formed upon one end of a cam locking pawl 618. A plate 620 is welded to the upright channel 40 and has a pin 622 mounted thereon that serves as a pivot for the pawl 618. A cylinder 624 is pivotally mounted upon the plate 620 by a pin 626. A piston rod 628 extends from the cylinder 624 and is connected by a pin 630 with the lower end of the pawl 618. The cylinder 624 actuates the piston rod 628 toward the left to release the pawl 618 upon admission of air under pressure into the left end of said cylinder, whereupon the shaft 530 is unlocked and can rotate.

The drive ratio of the sprockets transmitting a drive between the countershaft 522 having the one-revolution clutch 576 associated therewith, and the main drive shaft 530 is two to one, so that the countershaft 522 turns through one revolution, while the main drive shaft 530 turns through half a revolution. Consequently, the cam 612 is designed so that, after the shaft 530 has turned through each one-half revolution, the locking pawl 618 engages one of the notches 614 to lock the shaft 530 in position until the clutch 576 is again released.

The locked positions of the main drive shaft 530 correspond to the horizontal positions of the bag-arms 360. One locked position of the shaft 530 corresponds to the position of the bag-arms 360, shown in dot-and-dash lines in FIG. 9, namely, the position of the arms upon delivery of an open bag to the bag-filling spout. The other locked position of the main drive shaft 530 corresponds to the position of the bag-arms 360 shown in full lines in FIG. 9, namely, after the fingers 448 have entered a partially opened bag, and the arms are about to be spread apart by the linkage 552, 570, et cetera, to further open, and to grip the bag during a transfer thereof from the stack to the bag-clamping means on the filling hopper.

The cam-locking pawl 618 is controlled by the same cam 486 and switch 482 that control the clutch release pawl 590, so that both pawls are substantially simultaneously released. However, the control of the pawl 618 is such that it is actuated by the cylinder 624 to positively re-enter one of the notches 614 of the locking cam 612 after the main drive shaft has made half a revolution.

Assuming that the bag-arms 360 are in the bag-hanging position shown in dot-and-dash lines in FIG. 9 at the time that the clutch pawl 509 is released, as described above, the arms will have arrived at their bag-hanging position at the time that the cam-locking pawl 618 re-enters one of the notches 614 to lock the main drive shaft 530. The cam 498, FIG. 13, on the right-hand arm drive shaft 366 also will have assumed a position in which the projection 500 actuates the switch 494 to effect disengagement of the cam release pawl 590 and the cam-locking pawl 618 to permit the shaft 530 to complete its revolution and move the bag-arms 360 to their bag-opening position shown in full lines in FIG. 9.

At about the time the projection 500 actuates the switch 494, the wide projection 502 on the cam 498 will actuate the switch 496, which controls a conventional solenoid valve (not shown) for admitting air under pressure into the bumper cylinders 464 to positively move the bag-arms 360 inwardly to release the bag before the bag-arms start moving toward their bag-pickup position. Simultaneously with the operation of the bumping cylinders 464, the cam projection 502, although moved toward the left as the bumper cylinders operate, nevertheless remains in engagement with the switch 496 which is arranged so that it effects the solenoid valve to exhaust operating fluid from the cylinder 562 to relieve the expanding pressure acting on the bag-fingers 448 through the links 552 and 570. Upon effecting the second release of the cam-locking pawl 618, the main drive shaft 530 is permitted to complete the remaining half of the revolution, whereupon the clutch release pawl again engages the step 580 to prevent further rotation of the driven element of the one-revolution clutch 576.

The cam 502 and switch 496 are also arranged to operate the solenoid valve (not shown) to admit operating fluid into the lower end of the cylinder 562, at about the time the bag-arms 360 have cleared the hopper structure 650, to positively move the arms toward each other, so that the bag-fingers 448 can readily enter a partially open bag.

Movement of the bag-arms 360 away from each other to fully open a bag is controlled by a cam 573, FIGS. 7 and 11, mounted on the main drive shaft 530 and a switch 575 actuated by said cam which controls a conventional solenoid valve (not shown) for supplying air under pressure to the upper end of the cylinder 562 to operate the links 552 and 570 to move the shafts 362 carrying said bag-arms away from each other. The bag-arm fingers 448 are thus forced into engagement with the side walls of the bag to fully open and tightly grip the same, the pressure being maintained on the bag until it is delivered to the filling spout. The bag-arms 360 are moved apart just prior to release of the clutch pawl 590 and release of the cam-locking pawl 618 to permit movement of the bag-arms to withdraw a bag from the stack and deliver it to the bag-clamping means described later.

The bag-filling hopper structure 650 is best illustrated in FIGS. 9, 16 and 17. The hopper 650 is of reduced size at its lower end to form a discharge spout comprising a front wall 652, a back wall 654, and side walls 656. The side walls 656 are generally triangular in shape and terminate in an apex 658. The front and back walls 652 and 654 terminate short of the apex 658, as is best shown in FIG. 17. A generally rectangular housing 660 is welded to the spout 650 and includes vertical walls 662, each having a rubber gripper 664 secured thereto by a plate 663, FIG. 17A, and bolts 665.

The gates 666 are pivotally mounted on the housing 660 by pivot pins 668. Each gate 666 has a bead 670 extending across its full width, and which bead is engageable with the inner surface of a bag to clamp it against the grippers 664. The grippers 664 are preferably made of resilient material, such as rubber, and have a preformed groove 667 that mates with the bead 670, so that the bead can press a portion of the bag engaged thereby into the rubber to more firmly lock the bag in place relative to the grippers.

Each of the gates 666 has an operating lever 672 secured thereto for moving the gates from a closed position, illustrated in FIGS. 9 and 16, to an open position, shown in FIG. 17, in which latter position the gates cooperate with the grippers 664 to clamp the bag in position at the lower end of the hopper 650. Each gate 666 is actuated by an air-operated cylinder 674 pivotally connected at its upper end to the hopper 650 by a pin 676. A piston rod 678 extends from each cylinder 674 and is connected by a pivot pin 680 with the gate-operating arm 672. A piston 682 is mounted in each cylinder 674 and is operable upon admission of operating fluid into the lower end of the cylinders 674 to actuate the gates 666 to their open, bag-clamping position. Upon admission of operating fluid into the upper end of the cylinder 674, the filled bag is released and the gates 666 are moved to closed position to retain in the hopper the next load of material to be weighed and bagged.

One of the walls 662 of the housing 660 has a pair of brackets 686 mounted thereon which rotatably support a shaft 688. A rod 690 is mounted upon each end of the shaft 688 and normally extends across the space between the grippers 664, as is best shown in FIG. 9. Thus, the rods 690 extend across the path of travel of the bag as it is being delivered to the hopper by the bag-arms 360. Hence, the upper edges of the bag engage the rods 690 and rotate the same through a slight angle. A switch 692 is carried by a bracket mounted on the hopper wall 662 adjacent the shaft 688, and a cam 694 is secured upon the shaft 688 in a position to actuate the switch 692. The movement of the rods 690 upon engagement by the bag therewith is sufficient to rotate the shaft 688 and cam 694 to actuate the switch 692 to operate a conventional solenoid valve (not shown) which controls the supply and exhaust of operating fluid to the cylinders 674. Hence, as soon as a bag is placed in bag-filling position by the bag arms 360, the cylinders 674 are actuated to open the gates 666 and to clamp the bag in a position below the hopper 650. One of the features of the arrangement of the rod 690 and switch 692 is that the gates 666 cannot be opened unless a bag has been placed in bag-filling position beneath the hopper 650.

Referring to FIGS. 1A and 17, the switch 692, which controls the cylinder 674, is connected in a circuit (not shown) with a magnetic switch 698 mounted upon an adjustable arm 700 of the weighing scale 6. The arm 700 can be adjusted by turning knob 702 to a position corresponding to the desired weight to be dumped in the bag, for example, one hundred pounds. A movable arm 704 of the scale carries a magnet 706 which is adapted to actuate the switch 696 to interrupt the circuit formed by the switch 692, whereupon the solenoid valve (not shown) controlled by the switch 692 exhausts air from the cylinders 674, thereby releasing the gates 666 from their clamping position and permitting the loaded bag to drop onto the conveyor 12. The exhaust of air from the lower end of the cylinders 674 occurs substantially simultaneously with the introduction of air into the upper ends of these cylinders to effect the release of the gates 666 and movement thereof to their closed position.

The scale 6 includes a second adjustable arm 708 that may be manually adjusted by a knob 710 to any desired position corresponding to the point at which a dribble feed control associated with the bag-filling machine B becomes effective for continuing the flow of material into the bag at a slower rate until the exact desired weight is reached. The arm 708 carries a magnetic switch 712, which is actuated by the magnet 706 on the movable scale arm 704, so that, as the magnet passes the switch 712, the dribble feed control is set into operation. When the dribble continues to a point where the full weight has been made, the magnet 706 actuates the switch 696 to effect operation of the cylinders 674 to release the clamping action provided by the gates 666. Thus, the filled bags are automatically released from the filling spout and allowed to drop a few inches onto the conveyor 12, which moves the same to the right, as viewed in FIG. 1, to present the same to the bag-folder C, and to the bag-stitcher D.

FIGS. 27 to 30 illustrate bag-hanging machine A' that is substantially similar to the bag-hanging machine A, except that the rear vcuum cup 328 has been eliminated, along with the bag-elevating mechanism of FIG. 8, and a finger or picker has been added for effecting mechanical opening of the foremost bag in the stack. The machine has been further modified, in that the conveyor slide plate 128 of FIG. 9 has been eliminated and replaced by a different type of slide plate. For convenience, the parts of the machine A' corresponding to those of the machine A have been identified by the same numbers.

More specifically, an arcuate-shaped finger or picker 750 has a generally triangularly shaped body 751 and a shank 752 extending therefrom. The shank 752 is mounted upon a shaft 754 supported in brackets 756 mounted upon a plate 758, extending rearwardly from the linkage bracket 350. A cylinder 760 for operating the picker 750 is pivotally connected by a pin 762 to a bracket 764 secured to the back face of the bracket 350. A piston rod 766 extends from the cylinder 760 and is connected by a clevis 768 and a pin 770 with the shank 752 of the picker.

The picker 750 is especially shaped to adapt it to cooperate with bags 772 having a thumb notch 774, FIG. 29, formed in the upper edge of the front wall of the bag. The picker 750, when in its raised position, has its pointed end disposed in the notch 774, as shown. The triangular or tapered shape of the picker facilitates entry thereof into a bag, so that the point thereof can move the front wall of the bag forward, while a continually increasing area of the picker body 751 restrains the rear wall of the bag from moving forward.

The operation of the picker 750 is controlled by a cam 776, FIG. 28, mounted upon the main shaft 530. The cam is arranged to actuate a switch 778, which controls a conventional solenoid valve (not shown) for supplying operating fluid to the cylinder 760. At the appropriate time in the cycle, the cam 776 actuates the switch 778 to effect admission of air under pressure into the upper end of the cylinder 760 to move the picker 750 from its inactive position, shown in FIG. 28, to its positive bag-opening position, shown in FIG. 30.

A vacuum cup 330a, similar to the vacuum cup 330, is operated by a cylinder 346a mounted upon a bracket 780, which is located lower than the bracket supporting the cylinder 346, FIG. 9. In other words, the suction cup 330a is disposed in a plane below the thumb notch 774. The operation of the cylinder 346a is controlled by a cam 347a and a switch 349a, FIG. 27, on the main drive shaft 530, similar to the cam 347 and switch 349, whereby, at the appropriate time in the cycle, the cup 330a is forced against the front wall of the first bag in the stack and then moved rearwardly to separate the front wall from the rear wall of the bag. In this connection, the presence of the pointed end of the picker 750 in the bag notch 774 prevents the rear wall of the bag from being pulled forward, as the front wall of the bag is separated therefrom by the cup 330a.

In the normal operation of the bag-opening mechanism, the suction cup 330a will move the front portion of the bag forwardly into engagement with a bracket 782 (similar to the bracket 351, FIG. 9), which depends from a plate 758. The bracket 782 has a notch 784 aligned with, but larger than, the cup 330a, so that the cup can be retracted to a position beyond the bracket. After the vacuum cup 330a has partially, but not fully, opened the bag 772, the picker 750 enters the bag to positively separate the front and rear walls of the bag to condition the bag to receive the bag-opening fingers 448 in the same manner as described in connection with the bag-hanging machine A.

The operation of the remaining elements of the bag-hanging machine A' is the same as those of the bag-hanging machine A. It will be noted, however, that the sensing switch 126 of FIG. 9 has been replaced by a sensing switch 781, FIG. 28. The sensing switch 781 is mounted upon a modified bag slide plate 783 located beyond the forward end of the belt conveyor 66. The plate 783 has a piece of angle iron 786 welded thereto in an inverted position to provide a mechanical stop or abutment for the lower end of the stack of bags resting on the plate 783. The switch 781 includes an actuating member 788 that projects through an opening in the angle iron 786, so that it can be contacted by the foremost bag in the stack. The switch 781 controls the operation of the bag-supporting and -feeding conveyor, in the same manner as the switch 126 described in connection with the bag-hanging machine A.

The operator of the various mechanisms of the present machine has already been described in some detail. However, the following general description will be helpful in understanding the over-all operation of the machines.

In the operation of the foregoing bag-hanging and bag-filling apparatus, empty bags are manually placed on the belt conveyor 66 by loading the conveyor from the front to the rear with one edge of the bags engaging the guides 193. When the conveyor has been loaded with empty bags, the power supply switch is turned on and a circuit is completed to the conveyor drive motor 114 through the normally closed limit switch 126 located at the bottom of the stack at the front of the conveyor. If the bags are not in the proper position, the motor 114 will drive the conveyor 66 at a very slow, intermittent speed through the drive means 116, 120, 122, to move the bags into proper position, whereupon the circuit to the conveyor drive motor 114 is broken and the conveyor 66 stops operation. A circuit is also completed through the limit switch 284 to the motors 278 that drive the bag feed screws 274 located at the upper end of the bags.

At the proper time, the front bag in the stack is partially opened by the bag-opening mechanism (cups 228 and 230, or cup 230a and picker 750), as previously described, and the thus-opened bag is completely opened and removed from the stack by the bag-arms 360 and bag-fingers 448, so that the bag is transferred to the bag-filling spout. As the bags are removed from the stack, the pressure against the limit switches 126 and 284 is decreased, allowing the switches to complete circuits to the respective motors controlling the bag conveyor 66 and bag feed screws 274, so that the bags at the front of the stack are carried forward until proper placement for opening is accomplished.

In the normal operation of the bag-hanging machines, the bag-arms 360 are drawn inwardly to a minimum width or spacing as they rotate through an upper arc toward an empty bag. The front bag will have been partially opened before the bag-fingers 448 are moved into the bag, thereby effecting further opening thereof. As the bag-arms 360 reach the end of an 180° arc or stroke, they stop momentarily due to locking of the main shaft 530 in position with the bag-arms 360, as shown in full lines in FIG. 9. The linkage 552–570 is then actuated to linearly move the bag-arms 360 and fingers 448 apart to fully open the bag. The main drive shaft locking pawl 618 is then released and the one-revolution drive clutch 576 is simultaneously released, so that the bag-fingers 448 remove the open bag from the stack and transfer it to the bag-filling hopper during the movement of the bag-arms 360 through the lower 180° arc of their travel. At about the time that the bag-arms 360 begin their movement through the last-mentioned arc, the flaps 233 at the front of the stack are opened to release the first bag. After the bag has been removed, the flaps are returned to closed position to maintain the then-first bag in proper position to be opened.

As the bag-arms 360 present the open bag to the filler spout, the rods 690 which control the switch 692 associated with the bag-clamping means are actuated to open the gates 666 to clamp the bag against the grippers 664. The mechanism is so designed and timed that, when a bag is in proper position for filling and weighing, the main drive shaft 530 is again locked and the bag-arms 360 remain momentarily at rest. The bumper cylinders at this interval move the bag-arms 360 inwardly to release the bag from the bag-fingers 448.

In the event that a bag is not properly positioned to the bag-clamping means, the bag-filling machine B will not operate. Moreover, the bag-arms 360 will continue to move through their cycle, when the machine is in operation, even though no bag is in position to be removed from the stack.

Upon release of the bag-holding pressure applied by the bag-fingers, the shaft 530 is unlocked and starts to move the fingers out of the clamped bag as the bag-arms 360 start their return stroke. During the return stroke of the bag-arms 360, the linkage 552–570 is operated to move the bag-arms 360 toward each other, so that at about the time the arms reach the highest position in the return arc, they are moved inwardly without contacting the filling hopper. The inward movement of the bag-arms 360 positions the bag-fingers 448, so that they can enter another bag at the end of the upper 180° arc of travel. The foregoing cycle is repeated in each bag-hanging operation.

It will be understood that various changes may be made in the details of construction and in the proportions of the parts described hereinbefore, without departing from the principles of the invention or the scope of the annexed claims.

I claim:

1. Bag-hanging and bag-filling apparatus, comprising: means for supporting a bag in a stack in flat condition; bag-opening means engageable with the upper end of the first bag of the stack for separating the front and rear walls of the bag to open the same; a bag-filling hopper adapted to load material into said bag; bag holding and transferring means having fingers insertable into the open bag for holding the said bag and for carrying said bag from the supporting means into position below a bag-filling hopper; means operable by said bag for retracting the fingers to release the bag and to move the holding and transferring means away from the upper end of said bag towards said stack for carrying out a like operation with the next bag in the stack; and bag-elevating means for elevating the first bag in the stack to raise its upper end a desired amount above the upper end of the second bag in the stack.

2. Apparatus as defined in claim 1, in which the bag-elevating means includes a reciprocable element frictionally engageable with the first bag in the stack, and means for advancing and retracting said reciprocable element.

3. Apparatus as defined in claim 2, in which the reciprocable element is a roller, and in which the bag-elevating means includes means connected with the roller arranged to hold the roller stationary during advancing of the roller, and which permits the roller to rotate during retracting of the roller.

4. A bag-hanging machine, comprising: a belt conveyor for supporting a stack of bags in vertical flattened condition; means at the discharge end of said conveyor for elevating the first bag in the stack to raise its upper end a desired distance above the upper end of the second bag in the stack; bag opening means, including confronting suction cups disposed in a plane adjacent to the upper end of the bags in the stack and positioned so that the upper end of the first bag, upon being raised, is disposed between said cups; means for actuating said suction cups to engage the front and rear walls of the bag to separate the same to effect opening of the bag; and additional means for carrying the open bag to a filling station.

5. Bag-opening mechanism, comprising: a pair of suction cups disposed in spaced, but axially aligned, relation; means for positioning the upper end of a bag in the space between said cups; actuating means for effecting movement of said cups toward each other to engage the opposite sides of said bag; and means for controlling said actuating means to effect movement of the cups toward each other, movement of the cups away from each other, movement of the cups toward each other a second time, and movement of the cups away from each other a second time, in rapid succession.

6. Bag-opening mechanism for opening a flat bag having a thumb notch in its front wall, comprising: a suction cup for engaging the front wall of the bag below the thumb notch; a bag-opening finger having a retracted position in which an end thereof projects into the thumb notch in front of the rear wall of the bag; means for moving said suction cup toward and away from the bag, whereby the front wall of the bag is gripped by the suction cup and moved away from said finger and rear wall of the bag, said finger restraining movement of the rear wall of the bag, to thus effect partial opening of the bag; means for moving said end of said finger into the partially open bag to mechanically separate the front and rear walls of the bag; and additional means for carrying the open bag to a filling station.

7. A bag-opening mechanism as defined in claim 6, including means for stripping the front wall of the bag from the suction cup upon movement of the front wall of the bag a predetermined distance from the rear wall of the bag.

8. A bag-opening mechanism as defined in claim 7, wherein the notched bag also has gussets at the sides thereof; and wherein further means is provided for engaging the gussets to further open the partially opened bag.

9. Bag-opening mechanism for opening a flat bag having a thumb notch in its front wall, comprising: means for moving the notched front wall away from the rear wall of the bag; a bag-opening finger having a retracted position in which the end thereof is received in the notch in said front wall and prevents movement of the rear wall of the bag as the front wall moves away from said rear wall; and means for moving said finger into the bag in a path to restrain movement of the rear wall of the bag while moving said front wall away from said rear wall.

10. Bag-opening mechanism for opening a flat bag having a thumb notch, comprising: a suction cup for engaging the notched front wall of a bag; a bag-opening finger having a retracted position in which an end thereof projects into the thumb notch in front of the unnotched rear wall of the bag; means for moving said suction cup toward and away from the bag, whereby the front wall of the bag is gripped by the suction cup and moved away from said finger while the finger restrains movement of the rear wall of the bag to thus partially open the bag; and means for moving said end of said finger into the partially open bag to mechanically separate the front and rear walls of the bag.

11. A bag-opening mechanism as defined in claim 10, wherein the finger is curved and is pivotally mounted for rotation about an axis above the bag, the curvature of the finger and the location of the pivot being such that a portion of the finger remains in contact with the unnotched rear wall of the bag, while the end of the finger moves the notched front wall of the bag away from said rear wall.

12. A bag-hanging machine, comprising: means for supporting a stack of bags in vertical, flattened condition; means located above the height of the stack of bags for successively opening the bags in the stack; means for successively elevating the foremost bag in the stack to present the same to said bag-opening means; and additional means for carrying the open bag to a filling station.

13. A bag-hanging machine, comprising: means for supporting a stack of bags in vertical, flattened condition; bag-opening means at the forward end of the stack and located above the stack; and means for successively elevating the foremost bag in the stack to present the same to said bag-opening means, said last-mentioned means comprising a member frictionally engageable with the foremost bag in the stack, and means for successively moving said member upwardly relative to the bags in said stack.

14. In a bag-hanging machine: means for separating the front and rear walls of a flattened bag to partially open the same; bag-arms mounted to rotate about an axis parallel with the front and rear walls of said bag; a bag-finger carried by each bag-arm; means for effecting movement of said bag-arms away from each other after said bag-fingers have entered the open end of the bag, whereby to spread the sides of the bag apart and to secure the bag on said bag-fingers; a pair of grippers; means for effecting further rotation of said bag-arms to move the open bag to a position confronting said grippers with the front and rear walls of the bag disposed substantially parallel with the grippers; means for clamping the bag against said grippers; and means operable to effect movement of said bag-arms toward each other to release the bag from said bag-fingers.

15. In a bag-hanging machine, a pair of arms; means connected with one end of each of said arms for effecting rotation thereof about a common horizontal axis; a finger carried by the opposite end of each of said arms; means maintaining said fingers in vertical position regardless of the angular position of said arms; means for rotating said arms in synchronism; and means for moving said arms toward and away from each other, independently of the means for rotating the arms.

16. In a bag-hanging machine, a pair of longitudinally spaced, axially aligned, nonrotatable shafts; a rotatable drive shaft surrounding each stationary shaft; a rotatable sleeve surrounding each drive shaft; means providing a slidable driving connection between each drive shaft and sleeve; a bearing housing rotatably supporting each sleeve; means for driving each sleeve; a bag-arm rotatably mounted upon each stationary shaft; means drivingly connecting each of the drive shafts with one of the bag-arms; a pair of links, each link of said pair being pivotally connected with one of the adjacent ends of said stationary shafts; means pivotally connecting the other end of said links together; a second pair of links, one of which is pivotally connected with each of the links of said first-mentioned pair; means pivotally connecting one end of the second pair of links together and providing a fixed pivot therefor; and means connected with the pivot of the first-mentioned pair of links operable to move the same toward and away from said fixed pivot, whereby to effect corresponding longitudinal movement of the stationary shafts away from and toward each other.

17. In a bag-hanging machine as defined in claim 16, a sprocket disposed within each arm and fixed to the nonrotatable shaft; a second sprocket rotatably mounted in the opposite end of each arm; means securing a bag-finger in nonrotating relation to each of the second sprockets; and a chain interconnecting said sprockets, whereby the bag-finger is caused to remain in a predetermined position while said bag-arms are rotated.

18. A bag-hanging machine is defined in claim 16, wherein each of the bag-arms is provided with an opening at each end thereof, and with longitudinal grooves interconnecting said openings; and wherein bushings are nonrotatably mounted in each of said openings, a sprocket is rotatably mounted in each of said bushings, one of said sprockets being fixed to the nonrotatable shaft, and wherein a chain extends around said sprockets and lies in said grooves.

19. A bag-hanging machine as defined in claim 18, wherein a bag-finger is fixed to each of the other sprockets, whereby, as the bag-arms rotate, the bag-fingers always remain in a vertical position, regardless of the angular position of the bag-arms.

20. A bag-hanging machine as defined in claim 19, in which each of the bag-fingers is pointed at the end thereof remote from its connection with the sprocket, and wherein a rubber pad is secured to one face of the finger and has a configuration generally conforming with that of the finger.

21. In a bag-hanging machine, a nonrotatable shaft; a rotatable drive shaft surrounding said stationary shaft; a rotatable sleeve surrounding said drive shaft; means providing a slidable driving connection between said drive shaft and said sleeve; a bearing housing rotatably supporting said sleeve; means for driving said sleeve; a bag-arm rotatably mounted upon said stationary shaft; means connecting the drive shaft with said bag-arm; and means for moving said stationary shaft longitudinally relative to said drive shaft.

22. In a bag-hanging machine, a pair of longitudinally spaced, axially aligned, nonrotatable shafts; a bag-arm rotatably mounted on each of said shafts and including means adapted to enter the mouth of a bag; means for moving said stationary shafts toward and away from each other, said means including a pair of links, each link of said pair being pivotally connected with one of the adjacent ends of said stationary shafts; a movable pivot connecting the other end of said links together; a second pair of links, one of which is pivotally connected with each of the links of said first-mentioned pair; a fixed pivot connecting the other end of the second pair of links together; means connected with the movable pivot and operable to move the same toward and away from said fixed pivot, whereby to effect corresponding longitudinal movement of the stationary shafts away from and toward each other.

23. A bag-hanging machine comprising: means for partially opening a flattened bag; means for completing opening of said bag including a pair of fingers insertable into the partially open bag; and means for moving said fingers away from each other to spread the sides of the bag apart, said last-mentioned means including a first pair of links, one end of each of which is connected with said bag-fingers and each having the other end thereof connected by a movable pivot; a second pair of links, each having one end connected with one link of said first pair of links and having the other end thereof pivotally connected together by a fixed pivot, said fixed pivot and the movable pivot lying in a common plane.

24. In a bag-hanging machine: a main frame; an electric motor; a conveyor supported by said main frame, and advanced by the operation of said electric motor, said conveyor comprising a frame including side members connected together by transverse members, each of said side members including portions at the rear of the conveyor disposed horizontally and portions disposed at the front of the conveyor inclined forwardly and downwardly; a roller mounted at each end of said conveyor and an endless belt passing over said rollers; an idler roller supporting the upper run of the conveyor belt at a point adjacent the juncture of said horizontal and inclined portions of said side frame members; a sensing switch adjacent the inclined end of the conveyor which is responsive to bags carried by the conveyor for controlling the operation of the electric motor which advances the conveyor, in the event that the switch is not engaged by a bag being conveyed by the conveyor; a second idler roller supporting the lower run of said belt at a point adjacent said juncture; brackets secured to and extending laterally outwardly from each of said side members and each having a nut mounted thereon; shafts including a threaded portion extending through each of the nuts; means on said main frame rotatably supporting said shafts; a sprocket on each shaft; a chain extending around the sprockets on said shafts; means for driving one of said shafts for imparting rotary movement to the remainder of the shafts through said sprockets and chain, whereby to raise and lower said conveyor relative to said main frame.

25. A bag-hanging machine comprising: an endless conveyor for supporting and conveying a stack of bags in vertical flat condition; means for driving said conveyor; sensing means positioned so that it is responsive to the lower leading end of said stack of bags for controlling the operation of said conveyor drive means; means at the upper end of the stack of bags for advancing the bags at the leading end of the stack; and means responsive to the upper portion of the leading end of the stack for controlling said bag-feeding means.

26. Bag-hanging and bag-filling apparatus, comprising: a main frame; a conveyor adjustably mounted on said main frame for supporting and conveying a stack of bags in vertical, flat condition; means carried by said conveyor for driving the same; guide means adjustably mounted on said main frame for maintaining the stack of bags in a desired position transversely of the conveyor; bag-opening means positioned at the forward end of the stack of bags for successively opening said bags; bag-fingers insertable into the open bag; means for actuating said bag-fingers to engage the bag and spread the side portions of the bag apart and to effect retention of the open bag on said bag-fingers; intermittently rotatable bag-arms for actuating said bag-fingers to remove the bag from the stack; means for driving said arms including a one-revolution clutch, a main drive shaft and means for locking said main drive shaft upon completion of each half revolution of said main drive shaft, whereby said bag-arms are stopped at the end of each half revolution thereof; a bag-filling hopper positioned in the path of movement of said bag, said hopper including spaced grippers positioned to receive the upper portion of the open bag therebetween; clamping means carried by said hopper including elements receivable within the open end of the bag, when the bag is positioned between said grippers; and means for actuating said clamping means to clamp the upper end of the bag against said grippers, said actuating means being responsive to the presence of a bag at said gripper means.

27. Apparatus as defined in claim 26, including means at the forward end of the conveyor responsive to the pressure of the stack of bags controlling the operation of the conveyor to advance the stack, and means at the forward upper end of the bag guide means also responsive to the pressure of the stack of bags for advancing the bags relative to said guide means.

28. A bag-hanging machine, comprising: a belt conveyor for supporting a stack of bags vertically in a flattened condition; bag-opening means located at the upper end of the first bag in the stack and including a pair of cups, one engageable with the front wall of the bag, and the other engageable with the rear wall of the bag; raising means for said cups to permit the cups to engage the opposite surfaces of the bag; means for actuating the cups to move them repeatedly toward and away from each other in rapid succession, stop means to permit engaging the cups with the respective walls of the bag associated therewith, means to thereafter move the cups apart to separate the front and rear walls of the bag to open the bag; and means for holding and moving said bag into a loading position including fingers insertable into the open bag for engaging and further opening the bag and for removing the bag from the stack at a point remote from the end of said belt conveyor to a loading station for introducing a determined load into the bag, said means further including movable retracting means for releasing the holding means from the loaded bag and for moving the freed holding means toward the stack for carrying out a like operation with the next bag in the stack.

29. A bag-hanging machine comprising: means for supporting a stack of bags in upright flat condition; guide means engageable with opposite sides of the bags in the stack; means for advancing the bags relative to the guide means including a screw having a thread engageable with the side edges of the bags of the stack, means for driving said screw including an electric motor and circuit to energize said motor; a normally closed switch responsive to the pressure of a bag thereagainst, the lifting of the bag pressure against the switch causing the circuit to the motor to be completed to energize the motor to drive the screw to feed the bag toward the switch; each of said guide means on opposite sides of the bag including a vertical plate fitted with a threaded sleeve transverse thereof, the sleeve on one plate having left hand thread, the sleeve on the other plate having a right hand thread, a screw having right and left hand threads engaging said sleeves which is rotated to adjust the guide means for bags of different width; means to rotate said last named screw to thereby adjust the width; a flap member pivotally mounted upon each of said guide plates at the forward end of the stack and normally disposed at substantially right angles to said guide plates to retain the foremost bag between said guide plates; means for successively removing bags from said stack and moving the same through a path aligned with the stack; and means for simultaneously actuating said flaps to swing the same into a position out of the path of travel of the bags as they are successively removed from the stack.

References Cited by the Examiner

UNITED STATES PATENTS

| | | | |
|---|---|---|---|
| 521,564 | 6/1894 | Ethridge | 271—2 X |
| 877,210 | 1/1908 | Martin | 198—177 |
| 1,436,644 | 11/1922 | Bricken | 53—35 |
| 1,716,783 | 6/1929 | Latimer | 53—35 |
| 1,935,558 | 11/1933 | Haskell | 272—49 X |
| 2,106,463 | 1/1938 | Long | 53—384 |
| 2,293,518 | 8/1942 | Moyle | 177—118 |
| 2,377,687 | 6/1945 | Howard | 53—187 |
| 2,432,024 | 12/1947 | Lipton | 198—117 |
| 2,632,589 | 3/1953 | Rowland | 177—118 X |
| 2,790,619 | 4/1957 | Schachte | 177—160 X |
| 2,828,596 | 4/1958 | Dowty et al. | 53—190 X |
| 2,833,097 | 5/1958 | Petrea et al. | 53—386 X |
| 2,888,961 | 6/1959 | Haver | 177—118 |
| 2,899,786 | 8/1959 | Harker | 53—187 |
| 3,050,918 | 8/1962 | Helm et al. | 53—188 X |

FRANK E. BAILEY, *Primary Examiner.*

LEONARD FORMAN, *Examiner.*